(12) United States Patent
Fong et al.

(10) Patent No.: US 10,921,913 B1
(45) Date of Patent: Feb. 16, 2021

(54) ROTATABLE KNOB INTERFACE

(71) Applicant: SYNAPTICS INCORPORATED, San Jose, CA (US)

(72) Inventors: Kelvin Fong, San Jose, CA (US); Robert J. Bolender, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/750,934

(22) Filed: Jan. 23, 2020

(51) Int. Cl.
*G06F 3/039* (2013.01)
*G06F 3/038* (2013.01)
*H01H 19/14* (2006.01)
*H01H 19/08* (2006.01)
*G06F 3/044* (2006.01)
*G06F 3/0362* (2013.01)
*G06F 3/041* (2006.01)

(52) U.S. Cl.
CPC .......... *G06F 3/0393* (2019.05); *G06F 3/0362* (2013.01); *G06F 3/0383* (2013.01); *G06F 3/0441* (2019.05); *G06F 3/0442* (2019.05); *G06F 3/0446* (2019.05); *G06F 3/04162* (2019.05); *H01H 19/08* (2013.01); *H01H 19/14* (2013.01); *B60K 2370/145* (2019.05); *H01H 2231/016* (2013.01)

(58) Field of Classification Search
CPC .. H01H 19/08; H01H 19/14; H01H 2231/016; B60K 37/06; B60K 2370/126; B60K 2370/145; B60K 2370/1438; B60K 2370/1442; G06F 3/0383; G06F 3/0446; G06F 3/0441; G06F 3/0362; G06F 3/0442; G06F 3/04162; G06F 3/0202; G06F 3/0227; G06F 3/04886; G06F 3/0393
See application file for complete search history.

(56) References Cited

U.S. PATENT DOCUMENTS

| | | | | |
|---|---|---|---|---|
| 9,612,660 | B2* | 4/2017 | Drescher | G06F 3/044 |
| 9,671,954 | B1* | 6/2017 | Jaugilas | G06F 3/044 |
| 2018/0046267 | A1* | 2/2018 | Kobayashi | G06F 3/044 |
| 2020/0004345 | A1* | 1/2020 | Ju | G01D 5/145 |
| 2020/0278761 | A1* | 9/2020 | Takaoka | G06F 3/044 |

OTHER PUBLICATIONS

"Startup Wants to Put Real Knobs on your Touchscreen", Synthtopia, Jun. 2014, www.synthtopia.com.*

* cited by examiner

*Primary Examiner* — Laurence J Lee
(74) *Attorney, Agent, or Firm* — Leydig, Voit & Mayer, Ltd.

(57) ABSTRACT

A rotatable device has a stationary base including bottom and top surfaces. The bottom surface has a first set of coupling electrodes configured to receive a reference signal from first electrodes of an attached input device, and second and third sets of coupling electrodes each configured to receive resulting signals from a second set of input device electrodes. The top surface of the stationary base has first, second and third top regions respectively connected to the first, second and third sets of coupling electrodes. The rotatable device further includes a rotary wheel, configured to rotate relative to the stationary base, with a bottom portion provided with alternating conductive and non-conductive regions and configured to align with the top portion of the stationary base. The resulting signals of the input device are modified by the relative positions of the stationary base and the rotary wheel.

20 Claims, 20 Drawing Sheets

ROTATABLE KNOB INTERFACE

TECHNICAL FIELD

Embodiments of this disclosure relate to a rotatable knob interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system of an automobile. In such cases, it is useful to interface a knob to a proximity sensor device.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A rotatable electronic device is disclosed. In one embodiment, a rotatable electronic device includes a stationary base including a bottom surface and a top surface, the electronic device configured to attach to an input device. In one embodiment, the bottom surface includes a first set of coupling electrodes configured to be aligned with, and receive a reference signal from, a first set of electrodes of the input device, and second and third sets of coupling electrodes respectively configured to be aligned with, and receive resulting signals from, corresponding second and third sets of electrodes of the input device. In one embodiment, the top surface includes a top peripheral portion including first, second and third regions respectively connected to the first, second and third sets of coupling electrodes. The electronic device further includes a rotary wheel provided above the stationary base, the rotary wheel including a bottom peripheral portion provided with alternating conductive and non-conductive regions and configured to align with the top peripheral portion of the base. In one embodiment, the resulting signal received at each of the second and third sets of coupling electrodes is modified by the relative positions of the stationary base and the rotary wheel.

In another embodiment, a sensing system is also disclosed. The sensing system includes an input device and a rotatable electronic device. The input device includes a display panel, processing circuitry, and a plurality of electrodes. The rotatable electronic device is configured to be attached to the display panel, and includes a stationary base including a bottom surface and a top surface. In one embodiment the bottom surface includes a first set of coupling electrodes configured to be aligned with, and receive a reference signal from, a first set of electrodes of the input device, and second and third sets of coupling electrodes respectively configured to be aligned with, and receive resulting signals from, corresponding second and third sets of electrodes of the input device. In one embodiment the top surface includes a top peripheral portion including first, second and third regions respectively connected to the first, second and third sets of coupling electrodes. In one embodiment the rotatable electronic device includes a rotary wheel provided above the stationary base, the rotary wheel including a bottom peripheral portion provided with alternating conductive and non-conductive regions and configured to align with the top peripheral portion of the base. In one embodiment, the resulting signal received at each of the second and third sets of coupling electrodes is modified by the relative positions of the stationary base and the rotary wheel.

In yet another embodiment, a method of processing signals from an input device having a rotational interface is disclosed. The rotational interface is attached to a display screen of the input device. The rotational interface includes a first set of coupling electrodes aligned with and coupled to a first set of electrodes of the input device, and second and third sets of coupling electrodes respectively coupled with corresponding second and third sets of electrodes of the input device. The method includes providing a reference signal to the first set of electrodes of the input device, and receiving a resulting signal on each of the second and third sets of electrodes of the input device, the respective resulting signals modified by the rotational interface. The method further includes determining a rotational position of the rotational interface based, at least in part, on the two resulting signals.

In another embodiment of the method, the rotatable interface further includes a stationary base, in which the first, second and third sets of coupling electrodes are provided, and a rotary wheel, coupled to the first, second and third sets of coupling electrodes, the rotary wheel including a bottom surface on which alternating conductive and non-conductive regions are patterned, and wherein the resulting signals are generated based, at least in part, on the respective coupling of each of the second and third sets of coupling electrodes with the alternating conductive and non-conductive regions of the rotary wheel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 15A illustrates a first example placement of a rotatable knob interface above an example sensor grid, according to one or more embodiments.

FIG. 15B illustrates a second example placement of a rotatable knob interface above a sensor grid, according to one or more embodiments.

Figure 1:
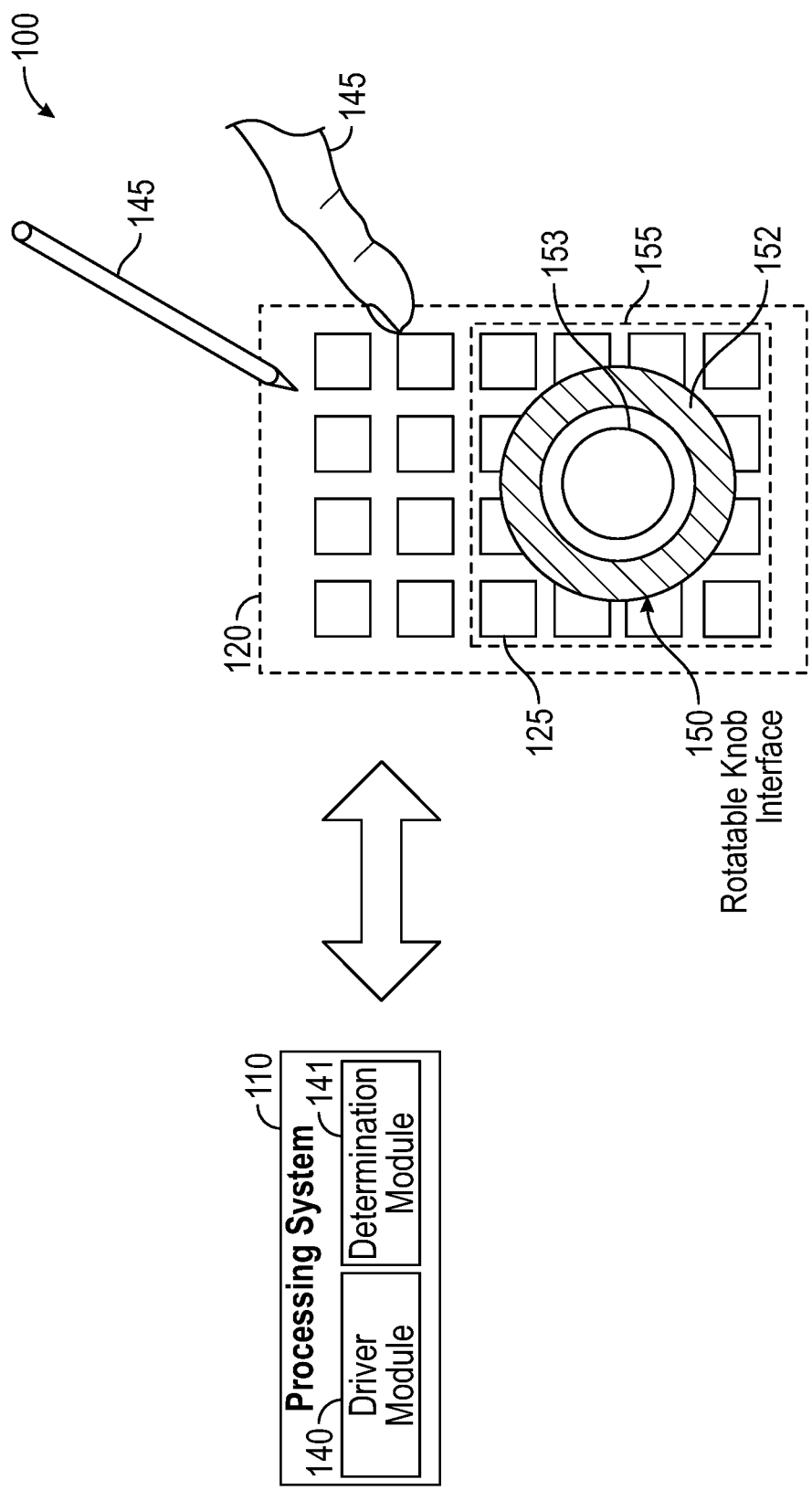
FIG. 1 illustrates an example input device with a rotatable knob interface, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

The following description may use perspective-based descriptions such as top/bottom, in/out, over/under, and the like. Such descriptions are merely used to facilitate the discussion and are not intended to restrict the application of embodiments described herein to any particular orientation.

The following description may use the phrases "in one embodiment," or "in one or more embodiments," or "in some embodiments", which may each refer to one or more of the same or different embodiments. Furthermore, the terms "comprising," "including," "having," and the like, as used with respect to embodiments of the present disclosure, are synonymous.

The terms "coupled with," along with its derivatives, and "connected to" along with its derivatives, may be used herein, including in the claims. "Coupled" or "connected" may mean one or more of the following. "Coupled" or "connected" may mean that two or more elements are in direct physical or electrical contact. However, "coupled" or "connected" may also mean that two or more elements indirectly contact each other, but yet still cooperate or interact with each other, and may mean that one or more other elements are coupled or connected between the elements that are said to be coupled with or connected to each other. The term "directly coupled" or "directly connected" may mean that two or elements are in direct contact.

As used herein, including in the claims, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 is a block diagram of an exemplary electronic device 100, in accordance with embodiments of the disclosure. The electronic device 100 may be configured to provide input to an electronic system (not shown), and/or to update one or more devices. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include the electronic device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. In other embodiments, the electronics system may be part of an automobile, and the electronic device 100 represents one or more sensing devices of the automobile. In one embodiment, an automobile may include multiple electronic devices 100, where each electronic device 100 may be configured differently than the other.

The electronic device 100 can be implemented as a physical part of the electronic system, or can be physically separate from the electronic system. As appropriate, the electronic device 100 may communicate with parts of the electronic system using any one or more of the following: buses, networks, and other wired or wireless interconnections. Example communication protocols include Inter-Integrated Circuit (I²C), Serial Peripheral Interface (SPI), Personal System/2 (PS/2), Universal Serial Bus (USB), Bluetooth®, Radio Frequency (RF), and Infrared Data Association (IrDA) communication protocols.

In one or more embodiments, the electronic device 100 may utilize any combination of sensor components and sensing technologies to detect user input. For example, as illustrated in FIG. 1, the electronic device 100 comprises one or more electrodes 125 that may be driven to detect objects or update one or more devices. In one embodiment, the electrodes 125 are sensor electrodes of a capacitive sensing device. In such embodiments, electrodes 125 include one or more common voltage electrodes. In other embodiments, the electrodes 125 are electrodes of an image sensing device, radar sensing device, and ultrasonic sensing device. Further yet, the electrodes 125 may be display electrodes of a display device. In some embodiments the electrodes 125 of the electronic device 100 are comprised of the common electrodes and have a common shape. Some of the examples described herein include a matrix sensor input device. As described in detail below, electronic device 100 may be provided with a rotatable knob interface 150, which may interact with some or all of electrodes 125.

The sensor electrodes 125 may have any shape, size and/or orientation. For example, the sensor electrodes 125 may be arranged in a two-dimensional array as illustrated in FIG. 1. Each of the sensor electrodes 125 may be substantially rectangular in shape. In other embodiments, the sensor electrodes 125 may have other shapes. Further, each of the sensor electrodes 125 may have the same shape and/or size. In other embodiments, at least one sensor electrode may have a different shape and/or size than another sensor electrode. In various embodiments, the sensor electrodes 125 may be diamond shaped, have interdigitated fingers to increase field coupling, and/or have floating cut-outs inside to reduce stray capacitance to nearby electrical conductors.

In one or more embodiments, some capacitive implementations utilize "self-capacitance" (or "absolute capacitance") sensing methods based on changes in the capacitive coupling between sensor electrodes and an input object. In various embodiments, an input object near the sensor electrodes, such as, for example, finger or stylus 145, alters the electric field near the sensor electrodes 125, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Capacitive sensing devices may be used for detecting input objects in proximity to and/or touching input devices. Further, capacitive sensing devices may be used to sense features of a fingerprint. Still further, as in the example of FIG. 1, in one or more embodiments, capacitive sensing devices may be provided with a rotatable knob interface that is electrically coupled to the capacitive sensing device, and may be used to sense the rotary position of the rotary knob. In some embodiments that include the rotatable knob interface, the rotatable knob interface may have a home position and a compressed position, and the sensing device may also be used to determine when the rotatable knob is in the home position, and when it is in the compressed position, based on a change in capacitive coupling of one or more of electrodes 125.

Continuing with reference to FIG. 1, a processing system 110 is shown as part of the electronic device 100. The processing system 110 is configured to operate hardware of the electronic device 100. As illustrated in FIG. 1, processing system 110 comprises a driver module 140, which may include a signal generator. In one or more embodiments, the driver module 140 generates sensing signals with which to drive electrodes 125. In various embodiments, the processing system 110 comprises parts of or all of one or more integrated circuits (ICs) and/or other circuitry components.

In some embodiments, the processing system 110 also comprises electronically-readable instructions, such as firmware code, software code, and/or the like. In some embodiments, components composing the processing system 110 are located together, such as, for example, near sensing element(s) of the electronic device 100. In other embodiments, components of processing system 110 are physically separate with one or more components in proximity to the sensing element(s) of electronic device 100, and one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. In some embodiments, the processing system 110 is dedicated to implementing the electronic device 100. In other embodiments, the processing system 110 also performs other functions, such as operating display screens, driving haptic actuators, etc.

The processing system 110 may be implemented as one or more modules that operate different functions of the processing system 110 (e.g., driver module 140, or determination module 141). Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In some embodiments, the electronic device 100 may be implemented as a chip, or as one or more chips. In some embodiments, the electronic device 100 may comprise a controller, or a portion of a controller, of electronic device 100.

In one or more embodiments, a display driver (e.g., driver module 140) may be configured for both display updating and input sensing, and may, for example, be referred to as including touch and display driver integration (TDDI) technology. In such embodiments, driver module 140 may be implemented as a TDDI chip, or a portion of a TDDI chip. In one or more embodiments, the electronic device may include matrix sensor and may also include TDDI technology.

In one or more embodiments, the processing system 110 further includes determination module 141. In one or more embodiments, the determination module 141 may be configured to determine changes in a capacitive coupling between each modulated sensor electrode and an input object, such as input objects 145, from the resulting signals. In one embodiment, all of sensor electrodes 125 may be simultaneously operated for absolute capacitive sensing, such that a different resulting signal is simultaneously received from each of the sensor electrodes or a common resulting signal from two or more sensor electrodes. In another embodiment, some of the sensor electrodes 125 may be operated for absolute capacitive sensing during a first period and others of the sensor electrodes 125 may be operated for absolute capacitive sensing during a second period that is non-overlapping with the first period.

In some embodiments, the processing system 110 responds to user input (or lack of user input) directly by causing one or more actions. Example actions include changing operation modes, as well as graphic user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. Further, in some embodiments, the processing system 110 is configured to identify one or more objects, and the distance to these objects. In some embodiments the processing system 110 is configured to identify one or more rotational changes of knob interface 150, or one or more changes of state of knob interface 150, or both, and map those changes to desired actions.

For example, in some embodiments, the processing system 110 operates electrodes 125 to produce electrical signals (resulting signals) indicative of input (or lack of input) in a sensing region. The processing system 110 may perform any appropriate amount of processing on the electrical signals in producing the information provided to the electronic system. For example, the processing system 110 may digitize analog electrical signals obtained from the electrodes 125. As another example, the processing system 110 may perform filtering or other signal conditioning, or, as yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, recognize fingerprint information, distance to a target object, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one or more embodiments, the processing system 110 is configured to generate a voltage signal to drive the electrodes 125 during a display update interval and an input sensing interval, respectively. In such embodiments, the voltage signal generated to drive the electrodes 125 during a display update interval is a substantially constant, or fixed voltage, and the voltage signal generated to drive the electrodes 125 during an input sensing interval may be referred to as a sensing signal, having a waveform with a periodically variable voltage. In one or more embodiments, the value of a voltage signal to drive the electrodes 125 during a display update interval may be predetermined. For example, the voltage value may be provided by a manufacturer of electronic device 100 and/or the electrodes 125, and may be device-specific to electronic device 100.

In one embodiment, the driver module 140 comprises circuitry configured to provide the sensing signal. For example, the driver module circuitry may include an oscillator, one or more current conveyers and/or a digital signal generator circuit. In one embodiment, the driver module circuitry generates the voltage signal based on a clock signal, the output of the oscillator and the parameters discussed above.

As noted above, in one or more embodiments, the driver module 140 generates a signal to drive the electrodes 125 during each of the display update periods and input sensing update periods. In such embodiments, an input sensing update period is provided in between two display update periods, and is of a shorter duration than a display update period. In such embodiments, there are several display update periods and input sensing update periods per display frame. In one or more embodiments, by acquiring the resulting signals over successive input sensing periods the rotation of the rotatable knob interface 150, as well as whether it is in its home state or compressed state, may be tracked.

As noted above, in one or more embodiments, an additional input apparatus may be provided on top of the display panel 120 of the electronic device 100, such as, for example, the rotatable knob interface 150, and may be electrically coupled to some or all of electrodes 125 that are positioned near or below it. In one or more embodiments, the additional apparatus may provide alternate ways for a user to provide input to electronic device 100 other than touching, or hovering near, a display screen with a finger or stylus 145. In the depicted example of FIG. 1, the rotatable knob interface 150 is mounted onto the display panel 120, and may have a full (as shown in FIG. 1) or partial overlap with the display panel 120. As noted, in one or more embodiments the rotatable knob interface 150 may have a stationary base (not visible in the top view of FIG. 1) that is provided with various sets of coupling electrodes configured to couple with respective sets of electrodes of the display panel 120, such as one or more sets of electrodes that are provided with sensing signals and one or more sets of electrodes that are provided with reference signals. In one or more embodiments, the stationary base may include different conductive regions respectively connected to corresponding sets of coupling electrodes.

In one or more embodiments, the rotatable knob interface 150 also includes a rotary wheel that sits above, and rotates relative to, the stationary base. In such embodiments, an underside of the rotary wheel is patterned with various conductive and non-conductive regions in a peripheral region 152, configured to align with the conductive regions of the stationary base so that there are various electrical couplings between the conductive regions of the stationary base and the various conductive and non-conductive regions in the peripheral region 152 of the rotary wheel. These components are further configured such that these electrical couplings change as the rotary wheel is rotated, in such manner that by detecting the effects of the changes in the electrical couplings on resulting signals received on the display panel, the input device can determine a rotation, or a change in rotation, of the knob interface. In one or more embodiments, patterned region 152 may have numerous possible example arrangements of the conductive and non-conductive regions, and there may be various ways of having the rotary wheel and the stationary base electrically interact as the rotary wheel is rotated. Thus, alternate configurations and relative arrangements of both the conductive regions of the stationary base, and the placement of the conductive and non-conductive regions of the rotary wheel are possible, all being within the scope of this disclosure.

In one or more embodiments, the rotation imparted to the rotatable knob interface by a user, in either relative or absolute terms, may be detected by the electronic device 100. In one or more embodiments, the rotatable knob interface 150 may also be pressed downwards by a user, and may thus have two positions, a home, or "uncompressed" position, and a "compressed" position, which a user maintains by, for example, pushing down on the knob interface 150 against one or more biasing springs. In one or more embodiments, the rotatable knob interface 150 has a cover. In alternate embodiments, the rotatable knob interface may be pressed downwards so as to rest at multiple positions, and thus may have multiple states between an "uncompressed" and a "fully compressed" position. In the home position the cover is at a greater distance above the rotary wheel than in the compressed position. In one or more embodiments, the rotary wheel may have several switches provided between it and the cover, these switches may include the biasing springs. In such embodiments, the rotatable knob interface 150 may be provided with a fourth set of coupling electrodes, which couple to electrodes of the input device that are also driven with sensing signals. In the example of FIG. 1, the fourth set of coupling electrodes is connected to an inner ring provided in the stationary base, which aligns with a similarly shaped inner ring 153 that is provided in the rotary wheel. In such embodiments, when a user presses down on the cover of the rotatable knob interface, so that the rotatable knob interface 150 is then in the "compressed" position, the switches close so as to connect the inner ring 153 of the rotary wheel with all of the conductive regions provided in patterned region 152. This serves to electrically couple the fourth set of coupling electrodes of the stationary base to the first set of coupling electrodes of the stationary base, thereby coupling a corresponding fourth set of electrodes of the display panel to a reference signal. However, when the user ceases to press down on the cover, the fourth set of coupling electrodes of the knob interface simply floats. In one or more embodiments, direction and degree of rotation, as well as a user pressing down on, or ceasing to press down upon, the rotatable knob interface 150, may be interpreted by processing system 110, such as, for example, by determination module 141, and may be mapped to various user input actions, signals, or directives.

It is noted that in one or more embodiments a user may rotate the rotatable knob interface 150 in various ways, for example, grabbing an outer housing of the rotatable knob interface and turning it, grabbing a top of the rotatable knob interface, or a flange protruding from the side of the rotatable knob interface and turning it, or placing one or more fingertips in or on a recessed channel on an upper surface of the rotatable knob interface.

In one or more embodiments, the electronic device 100 of FIG. 1 may be provided in an automobile. For example, it may be affixed to a substantially vertical display screen provided in a central part of a dashboard. In one or more embodiments, all the electrodes not physically blocked by the rotatable knob interface 150, whether the electrodes 125 are inside or are outside of region 155 (described below), remain active. Thus, in such embodiments, both touches away from the knob, and rotations of the knob, are detected and reported by the electrodes 125 at the same time.

In alternate embodiments, all other forms of user input besides those received via the rotatable knob interface 150 may be disabled on the electronic device. Thus, in such embodiments, the electrodes 125 are not driven during the sensing interval to perform their standard sensing functionality. As a result, if a finger or other object 145 is moved into, or away from, its vicinity, no resulting signal is obtained, or if obtained, it is not processed. In such alternate embodiments, this may be done to prevent a driver of the automobile from attempting to touch the display 120 while driving, as a safety measure, and thus to only interact with the electronic device 100 via the rotatable knob interface 150. In such alternate embodiments, the disabling of standard sensing functionality of the electrodes 125 may be implemented during specified activities of the automobile, but not during others. For example, the disabling of standard sensing functionality of the electrodes 125 may be implemented while the automobile is in actual motion, but at all other times some of the electrodes 125, for example, those not near enough to the rotatable knob interface to interfere with signals acquired from it, may be operated to perform standard sensing, as described above.

Thus, in some alternate embodiments, when all of the electrodes 125 are disabled from standard sensing, whether during actual driving of the automobile, or whether at all times, as the case may be, the only way that a driver of the automobile can provide input to the electronic device 100 is via the rotatable knob interface 150, using a pre-defined set of rotations and/or pressings of the rotatable knob interface 150. These motions modify a resulting signal which is received by the electronic device 100 during a sensing period, which then interprets them, for example, using determination module 141. The resulting signal may be the same signal as the sensing signal that driver module 140 drives an electrode 125 with, after being modified by the capacitive coupling of the rotary knob interface 150.

In other alternate embodiments, for example, only some of the electrodes 125, in particular those that are near or beneath the rotary knob interface 150, are disabled from standard capacitive sensing, and the remainder of the electrodes 125 on the electronic device 100 may still be operative for standard capacitive sensing. In such alternate embodiments, the electrodes that are disabled for standard capacitive sensing are those that are close enough to the rotatable knob interface 150 such that driving them with standard sensing signals may interfere with the resulting signals obtained from various sets of the electrodes 125 that are respectively electrically coupled to the coupling electrodes of the rotatable knob interface 150. To illustrate this feature, in FIG. 1 there is shown a dashed line boundary 155. Electrodes 125 within the boundary 155 are in a "blackout zone" and not driven with a standard sensing signal. Rather, as described in detail below, any of the electrodes within the blackout zone that are electrically coupled to the rotatable knob interface are driven so as to capture rotations and compressions of the rotatable knob interface, as described below.

In general, within the blackout zone, a first, second and third set of the electrodes 125 are coupled to corresponding first, second and third sets of the coupling electrodes of the stationary base of the rotatable knob interface 150. In embodiments, the first set are driven with a reference signal, and the second and third sets are driven with a sensing signal to obtain a resulting signal modified by the then extant relative rotational relationship of the stationary base and the rotary wheel of the rotatable knob interface 150. Thus, in each of these alternate embodiments, all of the electrodes within the blackout zone boundary 155 may be disabled from standard capacitive sensing at all times.

As used herein, the term "disabled electrode" may refer to an electrode that is not driven at all, an electrode that is driven with a guard signal, or one that is driven with a constant signal.

Continuing with reference to FIG. 1, as noted above, sets of electrodes of the electronic device 100 are electrically coupled to corresponding sets of coupling electrodes of the rotatable knob interface 150. Thus, during an input sensing period a reference signal is supplied by the driver module 140 to a first set of the electrodes 125, and a sensing signal is supplied to second and third sets of the electrodes 125. In one or more embodiments, the reference signal may be a configurable direct current (DC) output provided by the processing system 110. In some embodiments, the DC signal may be a ground signal of the electronic device 100. In some embodiments, a resulting signal is obtained from each of the second and third sets of the electrodes 125, where the resulting signals is the sensing signal as modified by the rotational state of the rotatable knob interface 150. The resulting signals are interpreted by the determination module 141 to determine a rotation of the rotatable knob interface 150. In one or more embodiments, the rotation may be determined in relative terms, such as, for example, a differential angular change from a prior position, or, for example, in absolute terms, such as, for example, a positive or negative angular change from a home position. In some embodiments, if the rotatable knob is turned more than a full 360 degree turn, the overall rotational distance that it has covered may also be measured. In such embodiments, one or more user commands may be mapped to absolute rotational distance. In alternate embodiments, only the one or both of overall angular change between starting position and ending position, or final absolute angular position, is measured.

Figure 2:
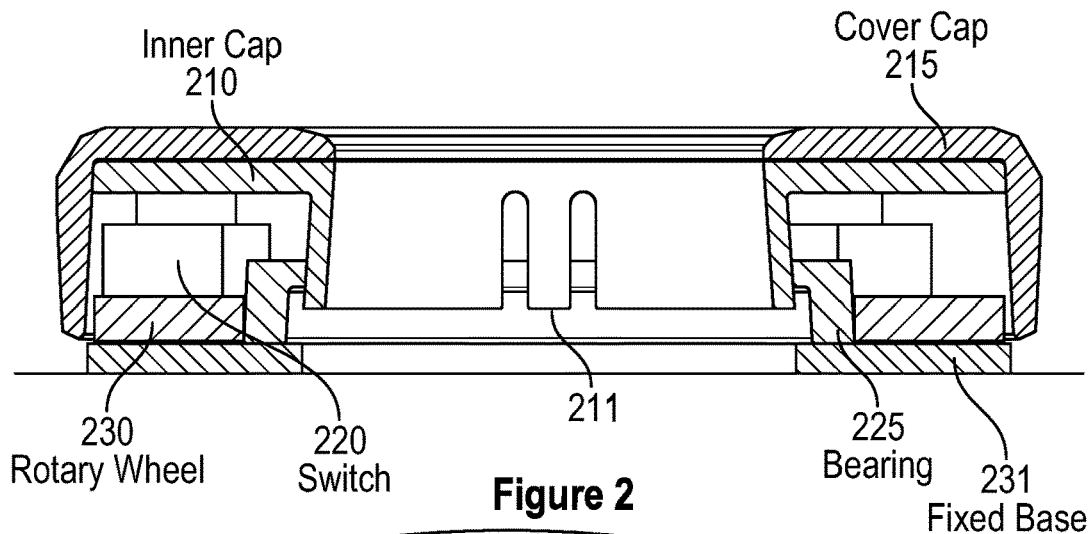
FIG. 2 illustrates a cross-sectional side view of an example rotatable knob interface, according to one or more embodiments.
Figure 3:
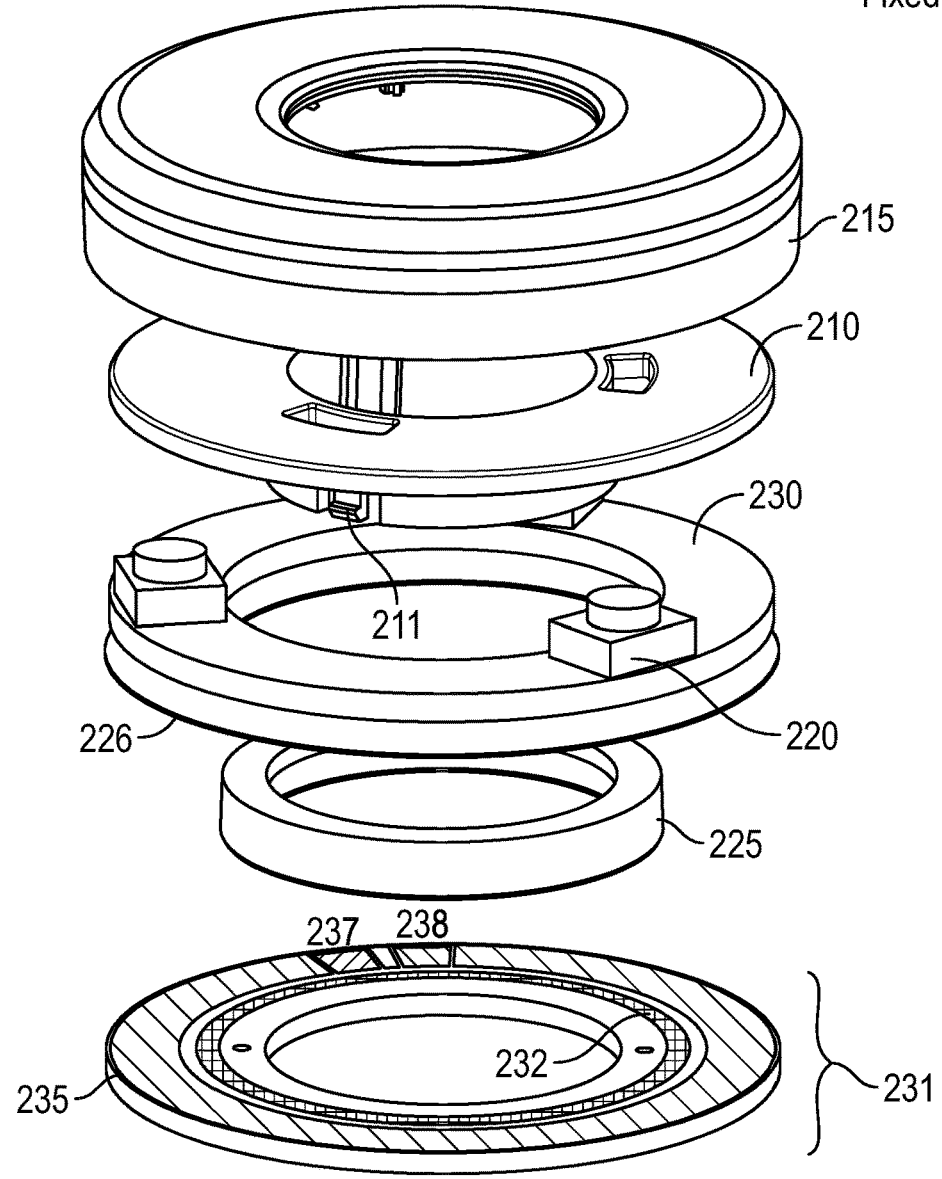
FIG. 3 illustrates an exploded view of the example rotatable knob interface of FIG. 2.

FIG. 2 illustrates six main components of an example rotatable knob interface, according to one or more embodiments. With reference thereto, starting at the bottom of the example device, there is shown a fixed base 231. In some embodiments, the fixed base 231 does not move as a user rotates the example knob interface. Thus, in some embodiments, it is affixed to the surface of an example input device, such as, for example, by an adhesive. In some embodiments, the fixed base 231 is affixed to the input device in a semi-permanent or permanent manner, and is placed thereon so as to align with a grid of electrodes provided in the input device. Provided above the fixed base 231 is a rotary wheel 230. The rotary wheel 230 turns as a user rotates the knob interface, such as, for example, by grasping and turning cover cap 215, as described below. At an inner side of the rotary wheel 230 is provided a vertical ring bearing 225. The vertical ring bearing 225 is non-conductive, and may be made of plastic, for example, and may have the shape of a ring. Vertical ring bearing 225 may have a substantially tubular shape. Not shown in FIG. 2, but described below with reference to FIG. 3, is an additional substantially horizontal ring-shaped bearing upon which the rotary wheel 230 sits, according to one or more embodiments. By using both of the bearings, frictional forces between the fixed base 231, and the rotary wheel 230 may be reduced.

Continuing with reference to FIG. 2, provided on top of rotary wheel 230 are one or more switches 220. For example, switches 220 may be dome switches. There may be three switches 220, and the switches may be equidistantly placed on an upper surface of rotary wheel 230. As described more fully below, in one or more embodiments, the switches are used to distinguish between two states of the knob interface, namely a compressed state, in which the switches are closed, and an uncompressed state in which the switches remain open. The compression state of the knob interface is orthogonal to its internal rotational position. Thus, the knob interface may be rotated while in either a compressed or an uncompressed state (and in any position in between the two states), and that rotation may be sensed and measured. Similarly, the state of the switches as being open or closed, corresponding respectively to the knob interface being in the "home" or uncompressed state, or in the compressed state, may be detected whether or not the rotatable knob interface is rotationally stationary or being rotated.

Finally, continuing still with reference to FIG. 2, the knob interface has an inner cap 210, and a cover cap 215, as shown. In operation, a user physically interacts with cover cap 215, for example, by grasping cover cap 215 and rotating the rotary wheel 230 relative to the fixed base 231, or by pushing down on cover cap 215 to compress the knob interface and close the switches 220. As shown, the inner cap 210 is attached, by prongs 211, to a lip provided on the inner surface of vertical ring bearing 225. The cover cap 215 is attached to the inner cap 210, such that turning the outer cap 215 rotates the rotary wheel 230.

FIG. 3 illustrates an exploded view of the example rotatable knob interface of FIG. 2, illustrating the upper side of various components. With reference to FIG. 3, beginning at the bottom of the figure, there is shown the upper surface of fixed base 231. The upper surface is provided with a conductive peripheral ring 235, to be coupled to a reference signal of an input device to which the rotary knob is to be attached. As shown, the upper surface also shows an inner conducting ring 232 as well as two conductive pads 237 and 238. In one or more embodiments, these three conductive regions are configured to be coupled to a sensing signal of the input device. Details of these regions, their functions, and how they interact with the input device upon which the rotary knob sits, are described in greater detail below.

Continuing with reference to FIG. 3, there are also shown the vertical ring bearing 225, and a horizontal ring-shaped bearing 226, configured to slide over it. In one or more embodiments, because the fixed base 231 has a smaller inner diameter than the rotary wheel 230, there is a ledge at the inner periphery of the fixed base 231 upon which the vertical ring bearing 225 may sit. The vertical ring bearing 225 is thus configured to fit inside the inner diameter of the horizontal ring bearing 226, and rest upon the inner periphery of the fixed base 231. The two bearings thus provide a physical interface between the fixed base 231 and the rotary wheel 230, as noted above, which reduces friction between them as the rotary wheel 230 is moved.

Continuing further with reference to FIG. 3, there are also shown three switches 220 provided around the upper surface of rotary wheel 230. As noted, these switches may be dome switches, for example. Above the switches 220 is shown the inner cap 210, which is configured to fit inside the vertical ring bearing 225, and be secured to the vertical ring bearing 225 by means of three prongs 211, which, in one or more embodiments are also placed equidistantly around the inner vertical surface of the vertical ring bearing 225. As shown, the inner cap 210 has a substantially horizontal upper ring, and a lower hollow cylindrical shaped portion. Thus, in one or more embodiments, the outer diameter of the lower cylindrical shaped portion of the inner cap 210, is designed to fit within an inner diameter of the vertical ring bearing 225, and then clamp to the bottom surface of the vertical ring bearing 225 by the prongs 211, which slightly protrude under such bottom surface when the inner cap 210 is in the home or uncompressed position. Finally, with reference to FIG. 3, the cover cap 215 is attached to the upper ring portion of the inner cap 210, as shown.

Figure 4A:
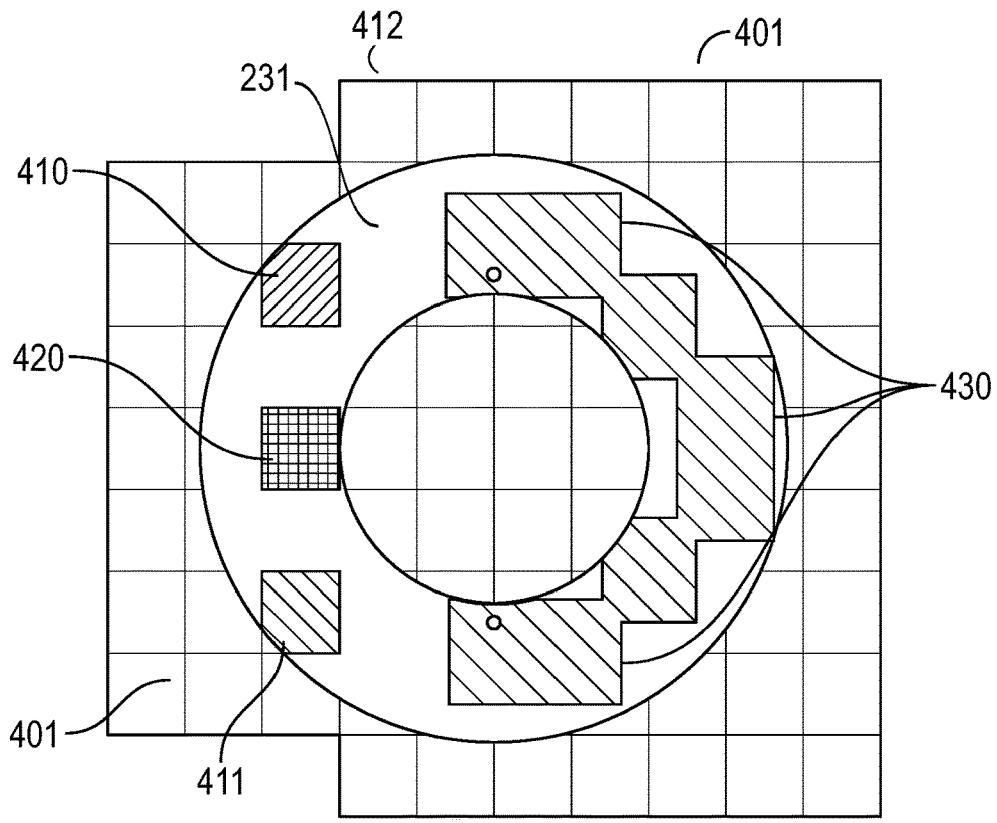
FIG. 4A illustrates an underside view of the fixed base of an example rotatable knob interface as shown in FIG. 3 with a first set of reference electrodes, and two sets of sensing electrodes according to one or more embodiments.
Figure 4B:
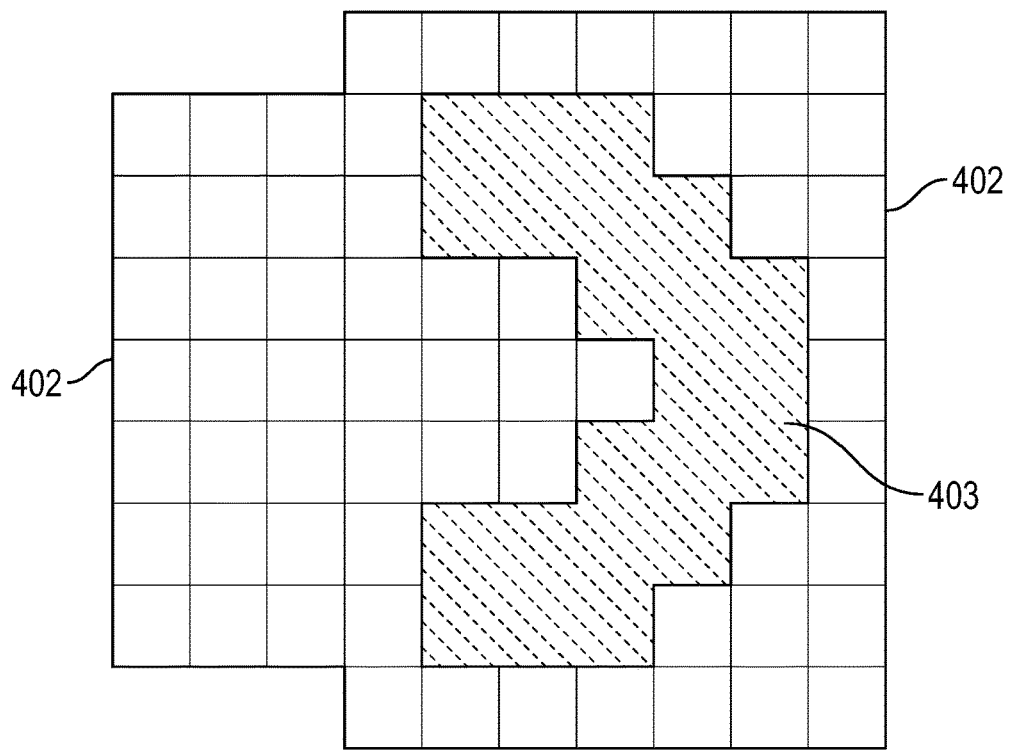
FIG. 4B illustrates an example portion of an input device with an electrode grid, the grid configured into two sets of electrodes, according to one or more embodiments.
Figure 4C:
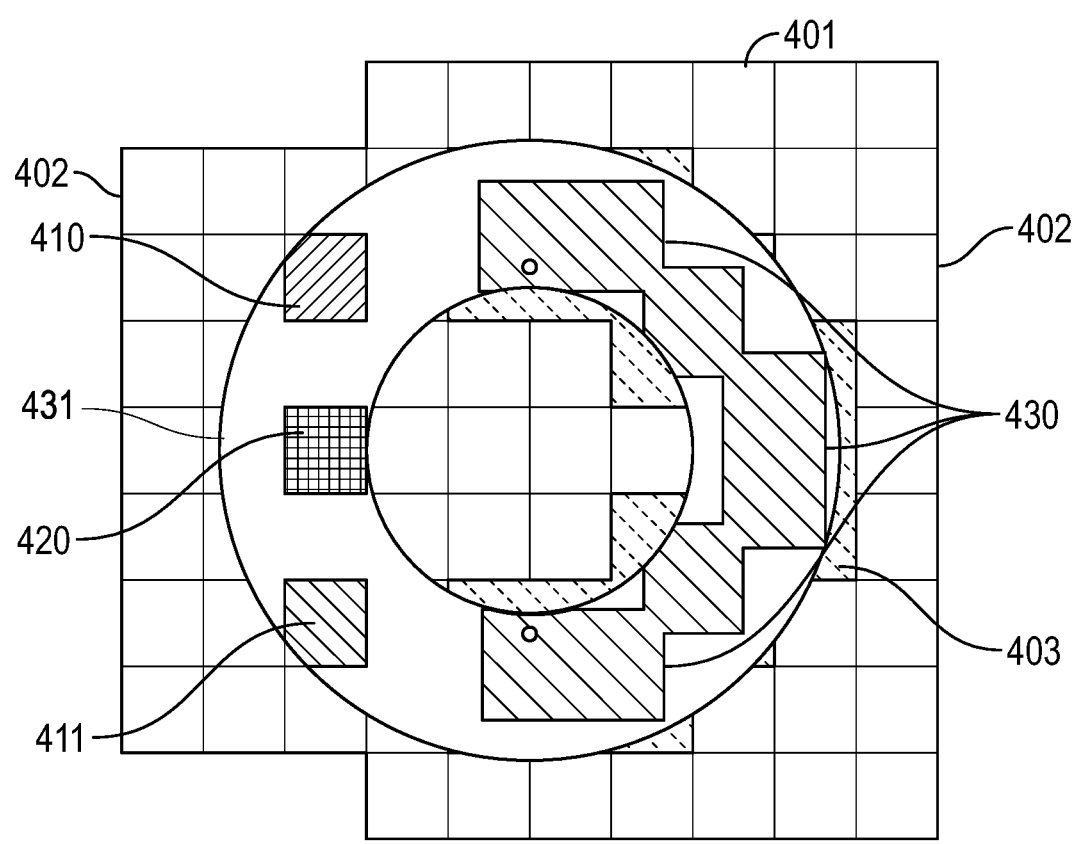
FIG. 4C illustrates the fixed base of an example rotatable knob interface of FIG. 4A as positioned over the example sensor grid of FIG. 4B, according to one or more embodiments.

FIGS. 4A through 4C, next described, illustrate the spatial relationships between coupling electrodes provided on the bottom surface of the fixed base 231, respectively connected to corresponding conducting regions on the top surface of the fixed base 231, and electrodes in a grid provided in an example input device.

FIG. 4A illustrates a view of the underside of the fixed base 231 of an example rotatable knob interface shown in FIG. 3, superimposed over a grid of electrodes 401 of an example input device, according to one or more embodiments. With reference thereto, the bottom, or underside, of fixed base 231 has three sets of electrodes. A first set 430, shown as shaded, is a connected set of electrodes configured to receive a reference signal from the input device. Three electrodes 410, 420, 411, grouped into the remaining two sets, are configured to receive sensing waveforms of the input device. The second set, including electrodes 410 and 411, is configured to sense rotation of the knob interface. The third set, including electrode 420, is configured to sense a "click" or the closing of the switches 220, for example, when a user pushes the knob interface into its compressed state. As shown, the sensing electrodes 410, 411 and 420 are designed to each overlap with, to the extent possible, a full input device electrode (e.g., a square) of grid 401. On the other hand, the set of electrodes 430 may be designed to each overlap portions of multiple electrodes of grid 401, but not full electrodes, such that the set of electrodes 430 only pick up signal from the corresponding reference electrodes 403 (see FIG. 4B) on the grid 401 on the upper surface of the example input device, and do not pick up any parasitic capacitance from neighboring sensing electrodes. This isolation is illustrated in FIG. 4A by two features. First, there is an empty column 412 of sensing pixels to the right of sensing electrodes 410, 411 and 420 that provides a gap between the sensing electrodes 410, 411 and 420, and the set of electrodes 430. Second, the set of electrodes 430 (full line shading) are each recessed inwardly relative to the reference electrodes 403 (shaded with dotted lines) by, for example, 1.5-2 mm. This recessing helps the set of electrodes 430 to only pick up the reference electrode signal and much less so of the parasitic coupling of nearby sensing signals on sensing electrodes 402. Further, this feature also helps with tolerance alignment of the example rotatable knob interface to the input device.

FIG. 4B illustrates the example grid 401 of FIG. 4A divided into two types of electrodes, according to one or more embodiments. In general, each electrode of an input device's grid may be selectively chosen to be driven with a sensing waveform or a reference signal, such as, for example, ground, or other reference signal. In one or more embodiments, to coordinate its grid with the electrodes of the underside of a fixed base, as shown in FIG. 4A, the input device's grid may be arranged as shown in FIG. 4B. Thus, grid electrodes 403, shaded in FIG. 4B, may be driven by the input device with a reference signal, and grid electrodes 402 may be driven by the input device with a sensing signal. In one or more embodiments, when this scheme is implemented, there is a pairing between the underside of the fixed base 231, and the electrodes of grid 401 of an input device. This is illustrated in the superimposed view of FIG. 4C.

FIG. 4C thus illustrates the underside of fixed base 231 of FIG. 4A as positioned over the example input device electrode grid 401 of FIG. 4B, according to one or more embodiments. As shown, the sensing electrodes 410, 411 and 420, configured for sensing on the knob interface, are each substantially fully aligned with grid electrodes 402, to be driven with sensing waveforms. In one embodiment, they are driven with the same sensing waveforms. Similarly, the set of electrodes 430, configured for coupling to a reference signal of the input device, are each provided above multiple grid electrodes 403, to be driven with a reference signal by the input device. In one or more embodiments, because the fixed base 231 is stationary, and fixed in position relative to the input device, it is first aligned to the electrodes of the input device, as shown, and then, in one or more embodiments, permanently attached to a glass surface of the input device.

Figure 5:
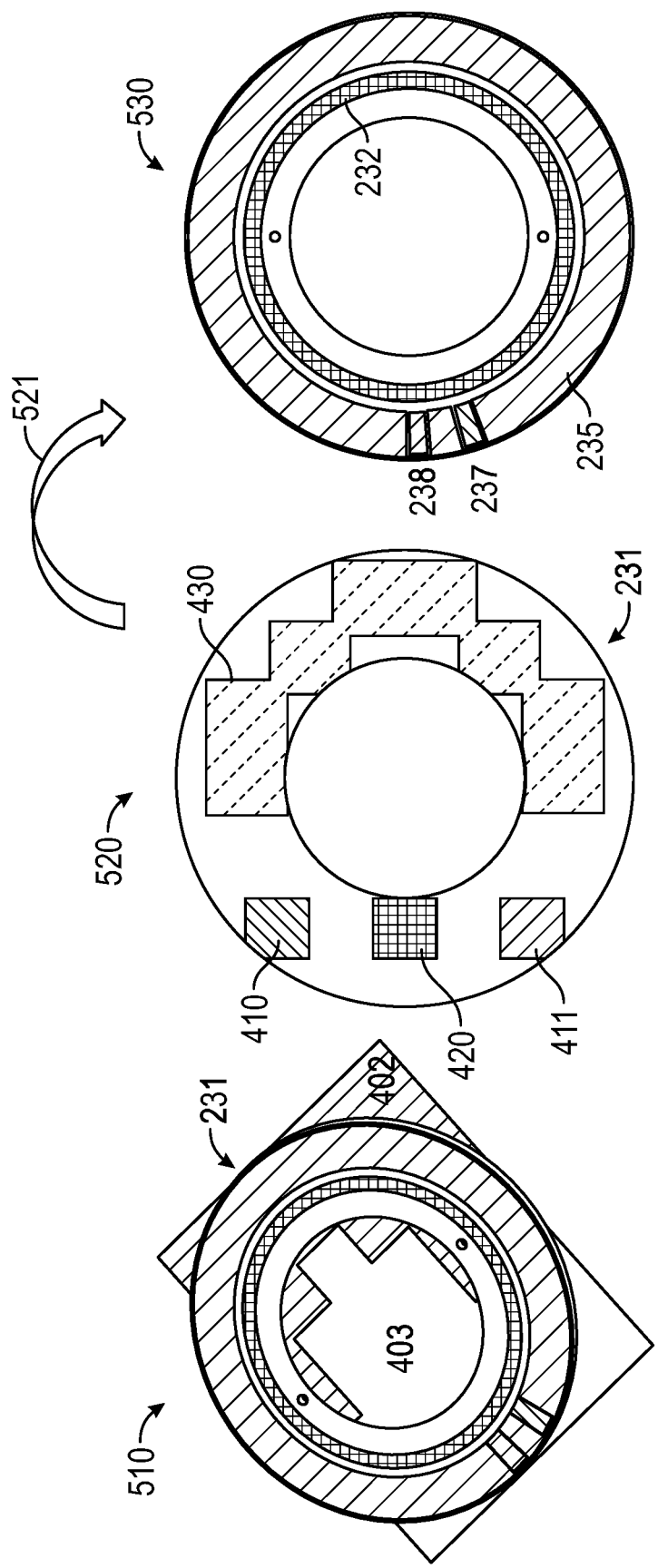
FIG. 5 illustrates a perspective top view, a bottom view and a top view of the example fixed base of FIGS. 3 and 4A through 4C, according to one or more embodiments.

Next described, with reference to FIG. 5, is the upper surface of the fixed base. With reference thereto, there is shown top perspective view 510, which illustrates the positions of input device electrode regions 402 and 403 relative to the top surface of fixed base 231, according to one or more embodiments. As shown in the top perspective view, as well as by comparing bottom surface view 520 with top view 530, the top surface of fixed base 231 is somewhat differently organized than its bottom surface. To fully appreciate the relative positions of conductive pads on the top and bottom surfaces, bottom surface view 520 is also shown, and, as indicated by the curved arrow 521, a corresponding position of the top surface is also shown, at top view 530. This top view 530 is what would be seen if the fixed base 231 as shown in bottom surface view 520 was flipped about a horizontal axis (such that right and left sides of the fixed base 231 are the same in views 520 and 530, respectively). Continuing with reference to FIG. 5, top view 530 illustrates four conductive regions, namely inner ring 232 (used to sense whether the switches are open or closed), the two conductive pads 237 and 238 (used to sense rotation) and peripheral ring 235. In one or more embodiments, each of these is electrically connected by vias to a corresponding conductive region on the bottom surface of fixed base 231. In particular, peripheral ring 235 is electrically connected to corresponding set of electrodes 430, as noted above, to couple to input device electrodes driven with a reference signal; the two conductive pads 237 and 238 are respectively connected to sensing electrodes 410 and 411; and inner ring 232, is electrically connected to sensing electrode 420. In some embodiments, as noted above, both conductive pads 237 and 238, as well as inner ring 232 are configured to couple to input device electrodes that are driven with a sensing signal.

Thus, in the embodiment shown, the top of fixed base 231 has, on its outer periphery, two small conductive pads 237 and 238 near each other, surrounded by a peripheral ring 235. The peripheral ring 235 receives a reference signal, and the two pads 237 and 238 each receive a sensing signal. The two pads are used to sense rotation. A second, thinner ring 232 inside of the peripheral ring 235 is configured to also receive a sensing signal to sense whether the switches are closed. The closing of the switches may also be referred to as a "click" from the sound they make when they close.

Figure 6A:
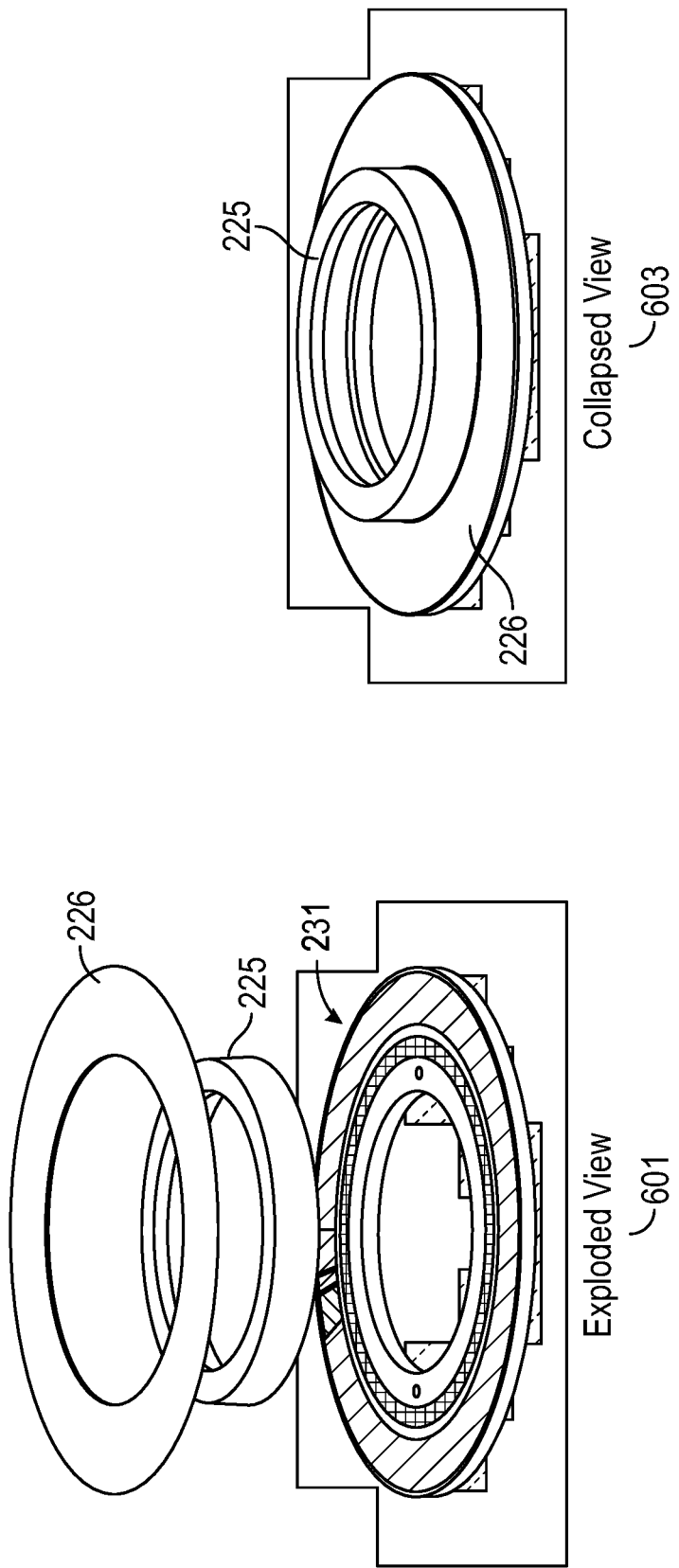
FIG. 6A illustrates exploded and collapsed views of the example fixed base and example plastic bearings shown in FIG. 3.

FIG. 6A illustrates exploded view 601 and collapsed view 603 of the example fixed base 231 and example vertical ring bearing 225 and horizontal ring bearing 226 (e.g., plastic bearing) shown in FIG. 3. As these elements have been previously described, they are not described again here. What is noted is, in one or more embodiments, as is shown in collapsed view 603, horizontal ring bearing 226 has a smooth surface on top of which the rotary wheel 230 can rest, and vertical ring bearing 225 has a smooth outer cylindrical structure around which the rotary wheel 230 can turn.

Figure 6B:
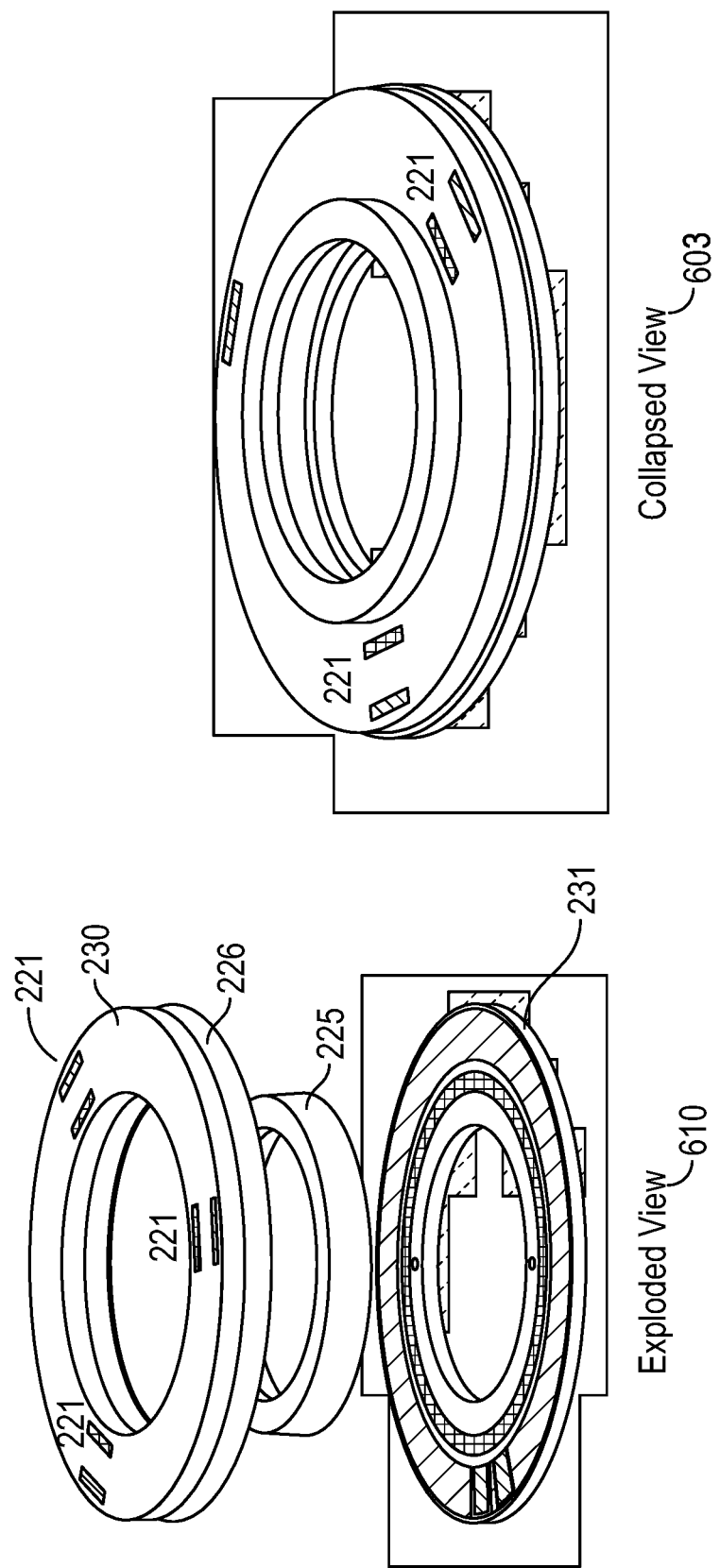
FIG. 6B illustrates the respective exploded and collapsed views shown in FIG. 6A, with the addition of the example rotary wheel of FIG. 3 provided on top of an example flat ring-shaped bearing.

FIG. 6B illustrates the respective exploded view 610 and collapsed view 603 of the of the example fixed base 231 and bearings 225, 226 shown in FIG. 6A, with the addition of the example rotary wheel 230 of FIG. 3 provided on top of an example flat ring-shaped bearing 226. As shown, the vertical ring bearing 225 has a larger height than that of the rotary wheel 230, such that it protrudes above the rotary wheel 230. Visible in each of exploded view 610 and collapsed view 603, are three sets of pads 221 provided on a top surface of the rotary wheel 230 for connection to the set of switches (not shown). This is described in greater detail below, after the organization of the bottom surface of the rotary wheel 230 is described.

Figure 7A:
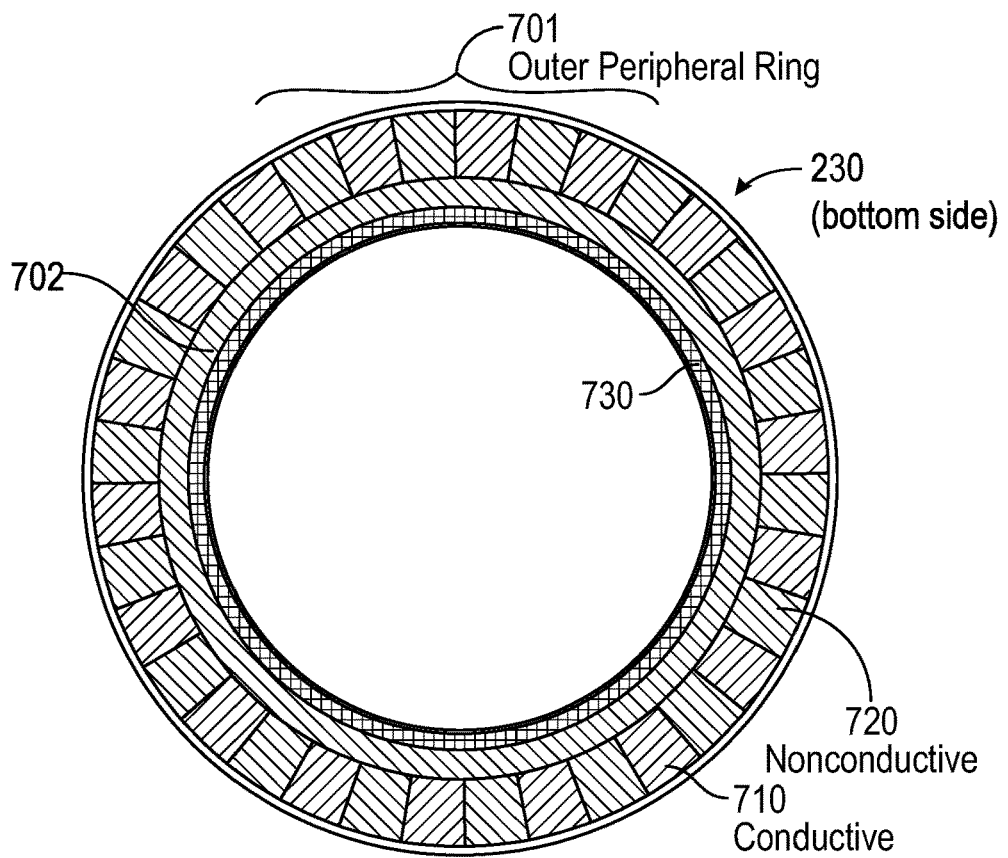
FIG. 7A illustrates a detailed bottom view of the rotary wheel of FIG. 3, according to one or more embodiments.

FIG. 7A illustrates a detailed bottom view of the rotary wheel of FIG. 3. With reference thereto, as in the case of the top surface of the fixed base, there are essentially two ring shaped structures. An outer peripheral ring 701 which comprises alternating first conductive regions 710 and non-conductive 720 regions, and an inner ring which comprises a single connected second conductive region 730, according to one or more embodiments. Additionally, the ring-shaped region 702, provided between the outer peripheral ring 701 and the inner ring second conductive region 730, is also non-conductive. In one or more embodiments, first conductive regions 710 are used to sense rotation, and inner ring second conductive region 730 is used to sense "click."

Figure 7B:
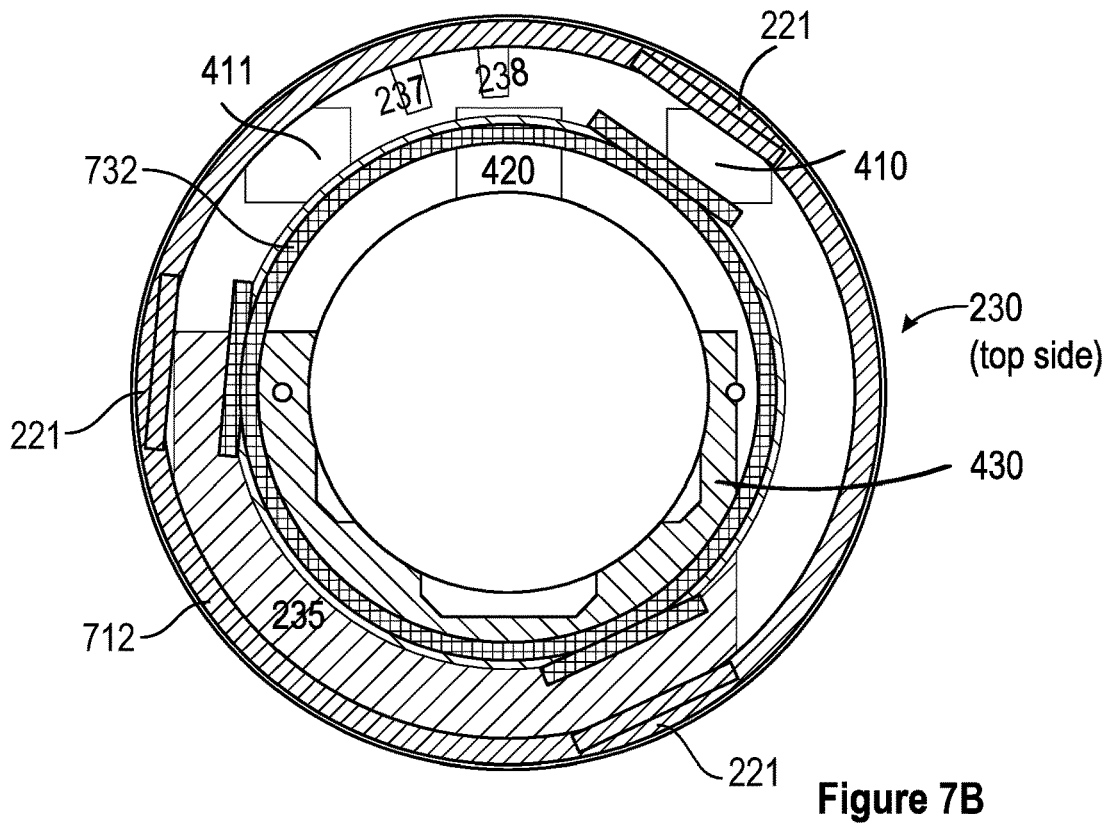
FIG. 7B illustrates a detailed top view of the rotary wheel of FIG. 7A, according to one or more embodiments.

FIG. 7B illustrates a detailed top view of the example rotary wheel of FIG. 3. The view of FIG. 7B corresponds to the view of the top surface of rotary wheel 230 shown in FIG. 6B that illustrates three sets of pads 221 which each respectively connect to a switch. As noted above, the switches may be dome switches, for example. However, the top view of FIG. 7B is drawn transparently, to show the underlying conducting rings to which each set of pads 221 is respectively coupled, as well as the other conductive regions on the bottom and top surfaces of the fixed base, previously described. These include, as shown here via the transparency, and as shown in FIG. 4A, on the bottom surface of fixed base 231, sensing electrodes 410, 420 and 411 and the set of electrodes 430 that is coupled to a reference signal of the input device; and on the top surface of fixed base 231, a portion of peripheral ring 235, and conductive pads 237 and 238.

In one or more embodiments, conductive regions 710, as well as conductive pads 237 and 238, and peripheral ring 235, may be made of known conductors, such as, for example, copper, silver, gold, aluminum, or other conductors, or, for example, various alloys of any of those, with each other, or with different elements or compounds. Similarly, in one or more embodiments, non-conductive regions 720 may be regions of a printed circuit board or substrate on which no metal is deposited, and thus be made of epoxy plastic and fiberglass, for example, or, for example, non-conductive regions 720 may be formed by depositing an insulating layer such as, for example, a silicon dioxide ($SiO_2$) layer.

As shown in FIG. 7B, there are two ring shaped conductive regions, namely outer ring region 712 and inner ring region 732, for example, provided just under the surface of the top side of the rotary wheel 230. Outer ring region 712 is electrically connected to each of the first conductive regions 710 on the bottom side of the rotary wheel, as shown in FIG. 7A, by vias (not shown). Similarly, inner ring region 732, provided on the inner periphery of the top side of the rotary wheel 230, is electrically connected to the second conductive inner ring region 730 on the bottom side of the rotary wheel, also shown in FIG. 7A, by vias (not shown). Additionally, in the depicted example of FIG. 7B, while the positions of the three sets of pads 221 to which the three switches are to be connected are shown, the switches that are to respectively connect to them are not shown. Thus, when the switches are closed, by a user pushing down on the cover cap 215 (shown in FIGS. 2 and 3) until the switches make a clicking sound or equivalent, the inner portion of each pad is electrically connected to the outer portion of each pad, which causes regions 712 and 732 to be electrically connected. This also causes, with reference to FIG. 7A, all of the respective first conductive regions 710 to be connected to the inner ring second conductive region 732. It is noted that there may be more or less switches, and corresponding sets of switch pads to which they connect, in alternate embodiments. In some embodiments the switch pads 221 maybe placed equidistantly around the rotary wheel 230, as shown. In some embodiments the switches may have more than two states, and thus have more positions than "compressed" or closed, and "uncompressed" or open." In such embodiments, the switches may have one or more intermediate states between "compressed" and "uncompressed", and a user may push down on the cover cap 215 to move between an "uncompressed" or fully open state, and each of the intermediate states and the fully closed state. In such embodiments, each position of the switch may be sensed, such as, for example, by signal strength of the electrical coupling at each state of the switch.

Figure 8:
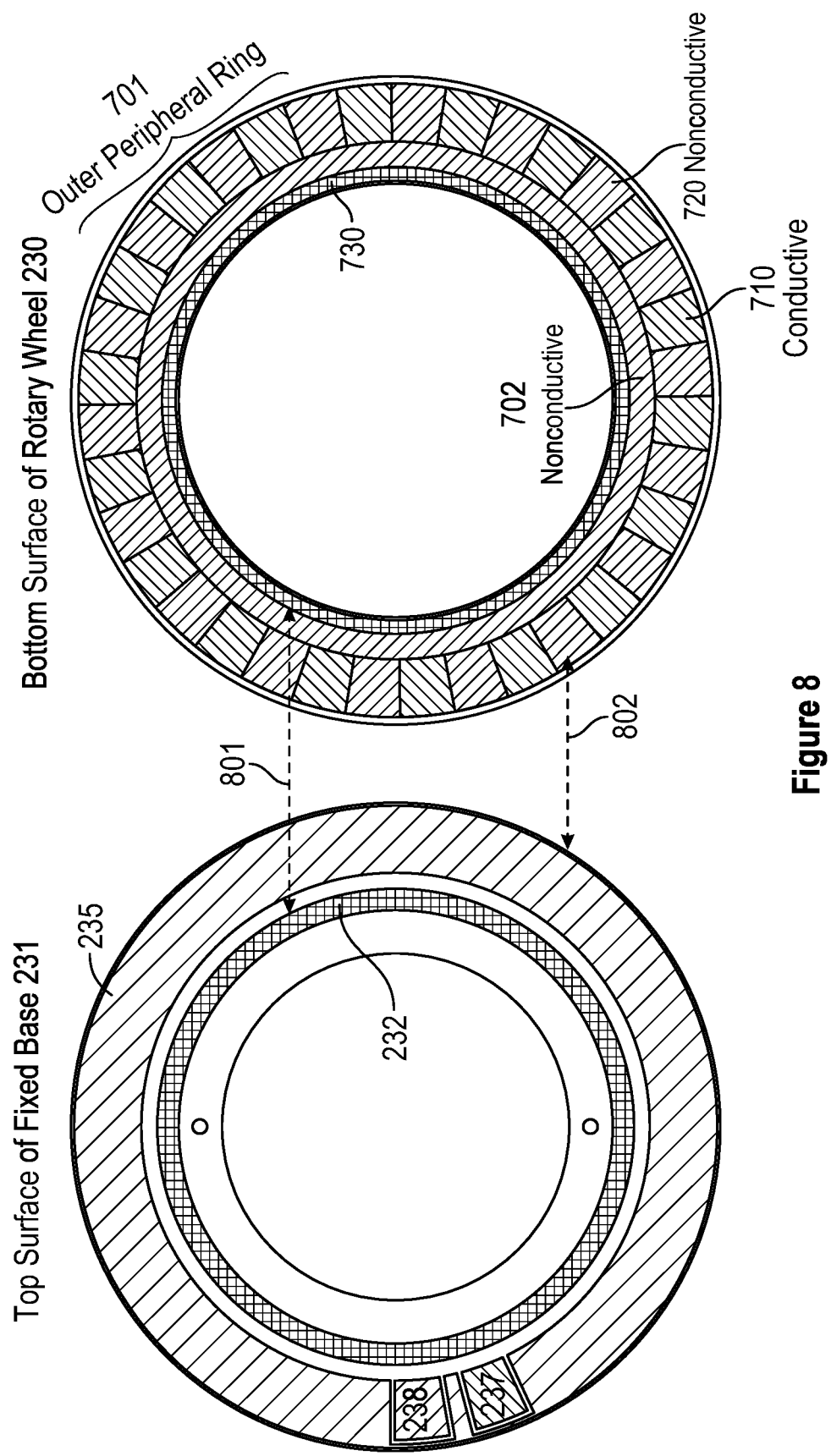
FIG. 8 depicts the top view of the example fixed base, and the bottom view of the example rotary wheel, as shown in FIGS. 5 and 7A, respectively, and capacitive coupling between them, according to one or more embodiments.

Given the descriptions above of the respective top and bottom surfaces of each of fixed base 231 and rotary wheel 230, FIG. 8 illustrates the electrical coupling between the top surface of the fixed base 231 and the bottom surface of rotary wheel 230, which, in one or more embodiments, face each other in the assembled rotary knob interface, when the rotary wheel 230 sits above the fixed base 231. With reference thereto, dashed arrow 801 depicts the electrical coupling between inner ring 232 of the top surface of the example fixed base 231, and the inner ring 730 of the bottom surface of the example rotary wheel 230. Additionally, dashed arrow 802 depicts the electrical coupling between peripheral ring 235 of the top surface of the example fixed base 231, which includes conductive pads 237 and 238, and the various conductive regions 710 of the outer peripheral ring 701 of the bottom surface of the example rotary wheel 230. As noted above, the regions 720 of the outer peripheral ring 701, of the bottom surface of the rotary wheel 230, are non-conductive, as shown, as is non-conductive divider ring 702, which is provided between the outer peripheral ring 701 and the inner conductive ring 730. In one or more embodiments, the respective pairs of regions indicated by the dashed arrows 801 and 802 are capacitively coupled, given the non-conductive horizontal plastic bearing 226 that sits between the two surfaces, as described above with reference to FIG. 6A.

As shown in FIG. 8, when the rotary wheel 230 sits above the fixed base 231 (with the horizontal bearing between them), there may be various electrical couplings between their respective peripheral ring regions. While the peripheral ring 235, which is coupled to a reference signal of the input device, via the set of electrodes 430, will generally always be capacitively coupled to a number of conductive regions 710 of the rotary wheel underside, whether one or both of the conductive pads 237, 238 are coupled to conductive pads 710 of the rotary wheel underside depends upon the relative rotational position of the rotary wheel 230 and the fixed base 231.

In one or more embodiments, in order to sense rotation, the two conductive pads 237 and 238 on the top surface of fixed base 231 may be coupled to electrodes on the surface of the input device that are respectively driven with sensing signals. As noted above with reference to FIG. 4A, the conductive pads 237 and 238 on the top surface of fixed base 231 are respectively electrically connected by vias with the sensing electrodes 410 and 411 provided on the bottom surface of the fixed base 231. In turn, sensing electrodes 410 and 411 are coupled to corresponding input device electrodes that are driven with sensing signals, as shown, for example, in FIG. 4C. In one or more embodiments, by driving the input device electrodes that are respectively coupled to the fixed base sensing electrodes 410 and 411 with sensing signals, different resulting signals are received by those input device electrodes as a function of the capacitive coupling of each of the two conductive pads 237 and 238 on the top surface of fixed base 231 with the array of conductive 710 and non-conductive 720 regions on the bottom surface of the rotary wheel 230.

Figure 9:
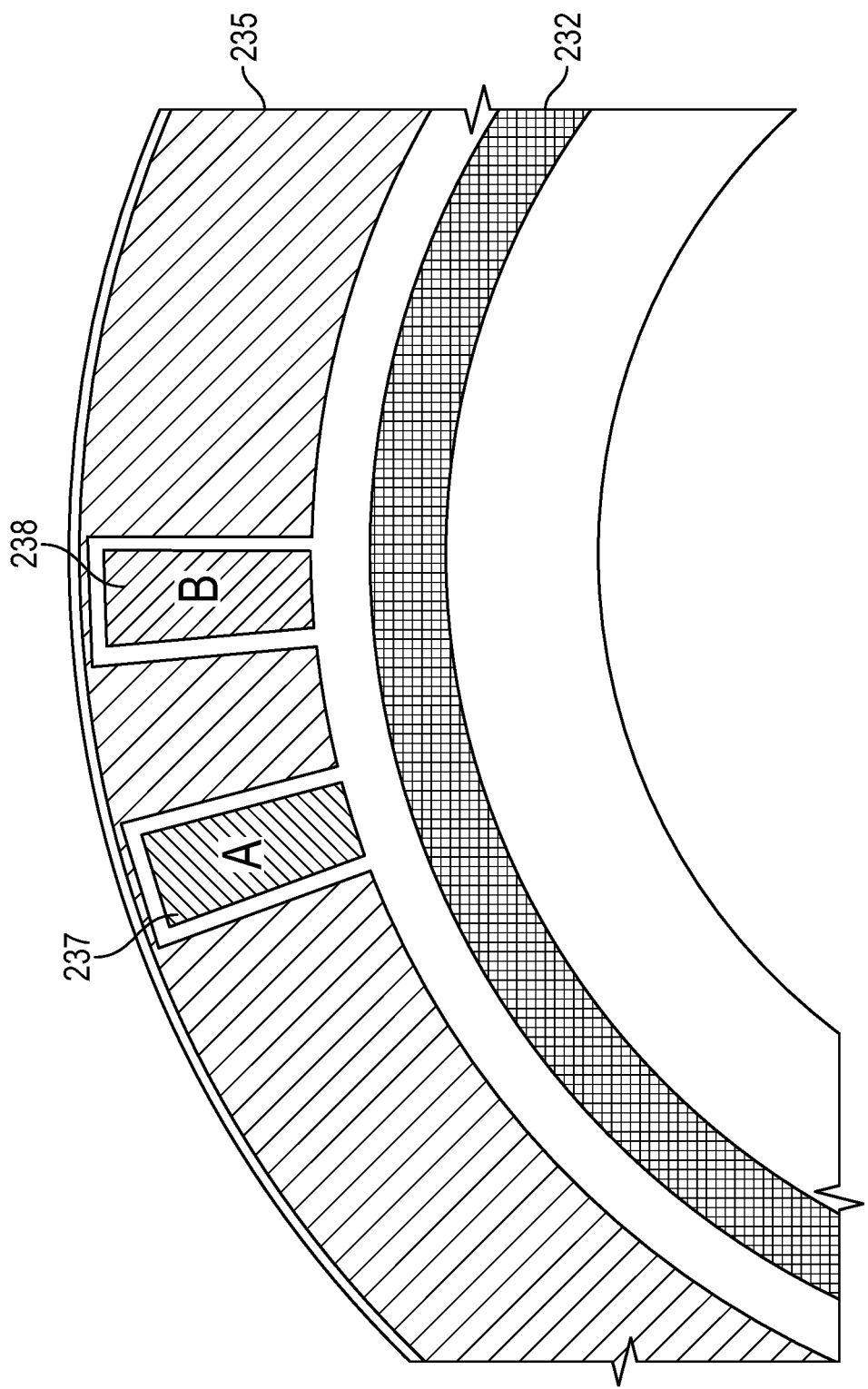
FIG. 9 illustrates example channel assignment of the outer region conductive pads of the top of the fixed base, according to one or more embodiments.

FIG. 9 is a small arcuate portion of the peripheral ring of the top surface of the fixed base subtending perhaps an angle of 35 degrees. The portion shown corresponds to the portion of image shown in FIG. 7B that includes conductive pads 237 and 238. To distinguish the signals coupled to each conductive pad, with reference to FIG. 9, in some embodiments conductive pad 237 is assigned to channel A and conductive pad 238 is assigned to channel B. For convenience, for example, sometimes conductive pad 237 may be referred to herein as the "channel A pad", and conductive pad 238 sometimes may be referred to as the "channel B pad." By measuring resulting signals received by the electrodes on the input device that are respectively coupled to each of conductive pads 237 and 238 at different points in time, it may be determined how much rotation, and in which direction, has occurred between the two data points. Also shown in FIG. 9 is the peripheral ring 235 (which is coupled to the set of electrodes 430 of the input device, and thus to the reference signal that drives them), and the inner ring conductive region 232 that is used to sense "click" of the switches closing, as described in detail below.

Figure 10:
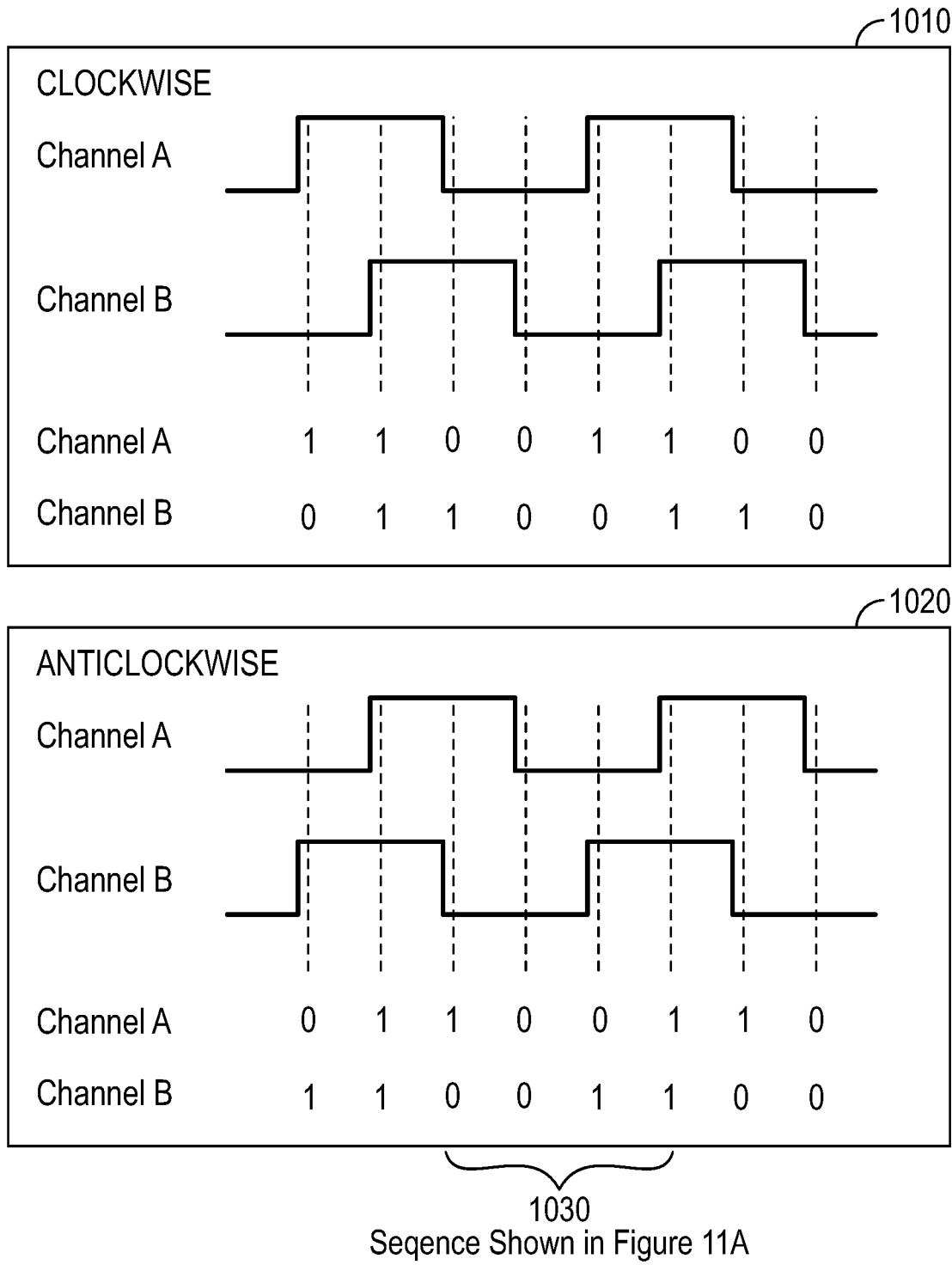
FIG. 10 illustrates example digitized quadrature encoder signals that may be generated by interaction of an example rotary wheel with an upper surface of the example fixed base of FIG. 9, according to one or more embodiments.
Figure 11A:
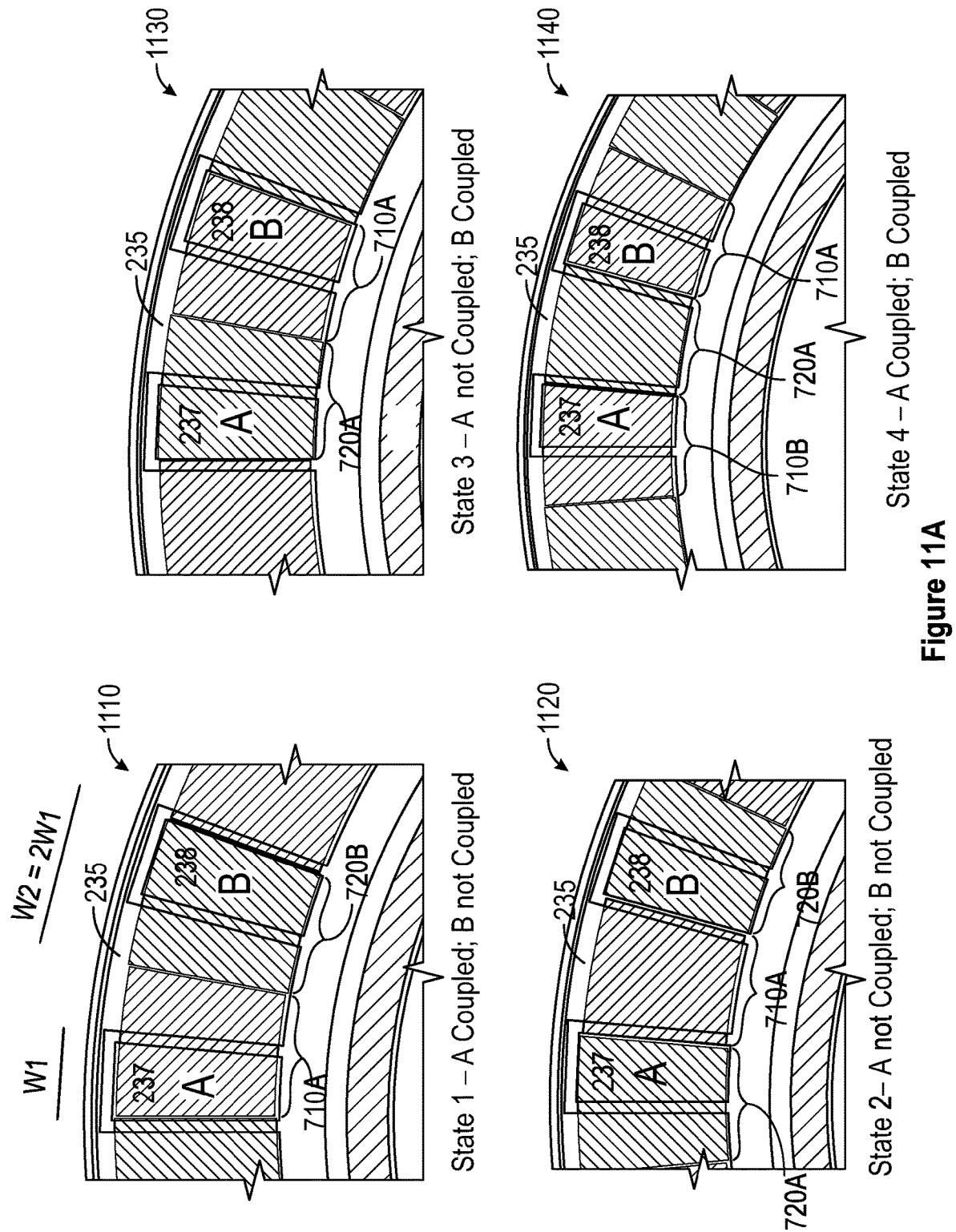
FIG. 11A illustrates four exemplary coupling states between the "A" and "B" designated conductive pads of the top of the fixed base of FIG. 9 and the bottom of the rotary wheel, according to one or more embodiments.

FIG. 10 illustrates example digitized quadrature encoder signals that may be generated by interaction of the conductive pads 237 and 238 of the example fixed base having the example channel assignments shown in FIG. 9, with the alternating conductive 710 and non-conductive 720 regions of the outer peripheral ring on the bottom surface of rotary wheel 230, as rotary wheel 230 is rotated by the user, according to one or more embodiments. The generated signals have one sequence for clockwise rotation 1010, and another sequence for anticlockwise rotation 1020. In some embodiments, relative rotation may be determined in firmware by comparing successive sequences. As shown, the respective signals used for channels A and B are identical, but are shifted 90 degrees in phase. These signals may be better understood with reference to all of the possible overlap states between conductive pads 237 and 238 of fixed base 231 with the underside pattern of rotary wheel 230, as is illustrated in FIG. 11A, next described. As next described, the four data points 1030 of the anticlockwise rotation sequence 1020, are shown in FIG. 11A.

FIG. 11A illustrates four possible coupling states, 1110 through 1140, of the "A" and "B" designated conductive pads 237 and 238 on the top of the fixed base 231 of FIG. 9, with the pattern of alternating conductive 710 and non-conductive 720 regions of the outer peripheral ring on the bottom of the rotary wheel 230, according to one or more embodiments. In FIG. 11A, only a small portion of the peripheral ring 235 of the fixed base, near where the conductive pads 237 and 238 are provided, is shown. The relative positions of the conductive pads 237 and 238 to the underside of the rotary wheel 230 generate the illustrated signals. FIG. 11A also shows a small portion of the peripheral ring 235 of the top of fixed base 231, as shown in FIG. 9 and described above, which surrounds conductive pads 237 and 238. Each of the four states depicted in FIG. 11A has a corresponding data point in the encoder signals of FIG. 10, as next described. In FIG. 11A, the view is from under the top surface of the fixed base 231, looking upwards, with conductive pads 237 and 238, and peripheral ring 235 shown transparently, so that the alternating conductive 710 and nonconductive 720 peripheral regions on the bottom of the rotary wheel 230 are seen in the background. To distinguish conductive and non-conductive regions 710 and 720, conductive region 710 is shaded using diagonal lines that run from top left to bottom right ("backslash"), and non-conductive region 720 is shaded with diagonal lines that run from bottom left to top right ("frontslash"), as shown.

In the depicted example of FIG. 11A the alternating conductive 710 and non-conductive 720 regions have the same shape and size. It is also noted that in the depicted example of FIG. 11A, the conductive pads 237 and 238, carrying channels A and B, respectively, on the upper surface of fixed base 231 are sized such that their pad width, W1 is one-half the width W2 of a conductive 710 or non-conductive 720 region of the bottom of the rotary wheel, such that two of conductive pads 237 or 238 could fit within, or underneath, one conductive 710 or non-conductive 720 region. Further, conductive pads 237 and 238 are separated from each other by two conductive pad widths W1, or one region (710, 720) width W2. The four states, as shown, indicate an anticlockwise rotation of the rotary wheel 230 relative to the fixed base 231. Accordingly, because, as noted, the view is from underneath the upper surface of the fixed base 231 looking into the bottom of the rotary wheel 230, it appears that the conductive pads 237 and 238, carrying channels A and B respectively, while in reality stationary, are moving anticlockwise relative to the bottom of the rotary wheel 230.

Beginning with State 1 1110, the channel A pad 237 of the upper surface of the fixed base 231 is coupled to a conductive region 710A of the bottom surface of the rotary wheel 230, but the channel B pad 238 is not, being underneath a non-conductive region 720B of the bottom surface of the rotary wheel 230, as shown. Thus, in terms of the encoder signals of FIG. 10, which follow the convention that "coupled to a conductive region 710"=1, and "coupled to a non-conductive region 720"=0, channel A has a 1 and channel B a 0, or an overall (A, B) value of (1,0). At State 2 1120, which indicates a one pad width W1 turn (which is a one half of a conductive or non-conductive region width W2 turn) of the rotary wheel 230 to the right, moving A pad 237 over to the left under a next non-conductive pad 720A, and moving B pad 238 to be under the left side of non-conductive pad 720B, now neither the A pad nor the B pad is coupled to a conductive region 710, and thus both channels A and B have a value of 0, or an overall (A,B) value of (0,0). The change from (A,B)=(1,0) to (0,0) is shown in FIG. 10 in the example anticlockwise signal set 1020 as the third and fourth data points in the sequence. At State 3 1130, A pad 237 has now moved by a single W1 turn to the left to be under the left side of non-conductive region 720A, and thus the A pad is still not coupled, but the B pad has moved one W1 turn to be underneath the right side of conductive region 710A, and now is coupled. Thus, channel A has a 0 value and channel B a 1 value, for an overall (0,1) value. Finally, at State 4 1140, the pads A and B have moved another single W1 turn to the left, corresponding to the rotary wheel above having turned another W1 turn to the right. Now both the A channel pad 237 and the B channel pad 238 are coupled to conductive regions of the rotary wheel underside. Pad A 237 has moved to the right side of conductive region 710B, and pad B 238 has moved to the left side of conductive region 710A, and thus both channels A and B have values of 1, for an overall (A, B)=(1,1).

Thus, the progression of data points (A,B) through the four states of FIG. 11A is from (1,0) to (0,0) to (0,1) to (1,1). As shown at 1030 of FIG. 10, this sequence indicates an anticlockwise rotation. As noted above, it is here assumed that when a conductive pad 237 or 238 of the fixed base 231 is aligned with a conductive region 710 of the rotary wheel 230's underside, its signal value=1, and when the conductive pad 237 or 238 is aligned with a non-conductive region 720 of the underside of rotary wheel 230, its signal value=0. In alternate embodiments, the inverse convention may be used.

In one or more embodiments, there is a relationship between the widths of conductive pads 237 and 238 (which have the same width, W1), and the widths of a conductive 710 or non-conductive 720 region (which have the same width, W2). In one or more embodiments, it is the relative widths of W1 and W2 that determine the resolution with which rotations of the rotary wheel 230 relative to the fixed base 231 may be detected. In one embodiment, as shown in FIG. 11A, the width W1 of each of conductive pads 237 and 238 is one half the width W2 of an underside conductive or non-conductive region 710 or 720. Thus, in such embodiments, a change in rotation as a conductive pad 237 or 238 moves a W1 step may be detected. This is because in a W1 sized step a conductive pad 237 or 238 either moves from being under one side of a region 710 or 720 to the other side of that region, as is shown in FIG. 11A for conductive pad 238 moving from one side of non-conductive region 720B to the other side of that region, between State 1 and State 2, or in a W1 sized step it moves from a second side of a region 710 or 720, to a first side of an adjacent region of the other type, as shown, for example, in FIG. 11A for conductive pad 237 moving from the second side of conductive region 710A to the first side of non-conductive region 720A.

Figure 11B:
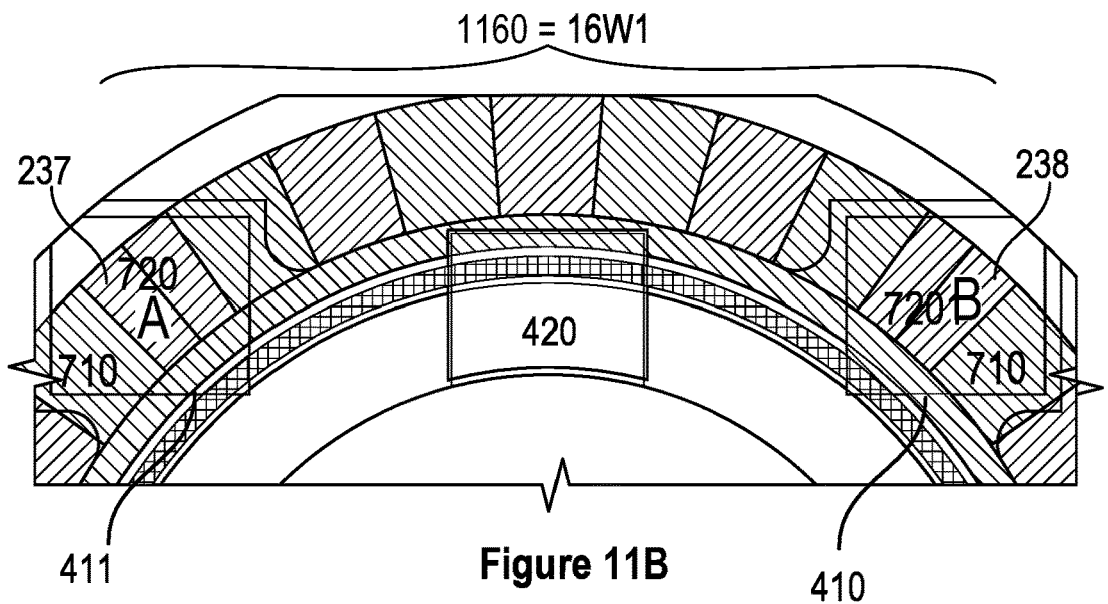
FIG. 11B illustrates an example distance between the two outer region conductive pads of the top of the fixed base of FIG. 9, according to one or more embodiments.

FIG. 11B illustrates an example distance 1160 between conductive pads A 237 and B 238 of fixed base 231 in terms of the W1 conductive pad width. The point of view here in FIG. 11B is now from underneath the entire fixed base 231, looking upwards into essentially FIGS. 4C and 5, where the three sensing electrodes 411, 410 and 420 of the bottom surface of the fixed base, and the two conductive pads A 237 and B 238 on the top surface of the fixed base, are all shown in transparent mode. As shown, there are sixteen conductive pad width W1 divisions between conductive pads A 237 and B 238. There are seven conductive/non-conductive regions 710, 720 between them, of width W2 each, as well as two additional W1 width regions, one to the right of A pad 237 and the other to the left of B pad 238. Conductive pads 237 and 238 are positioned above their corresponding coupling electrodes 411 and 410, respectively, on the underside of the fixed base. The distancing of pads 237 and 238 by a distance equal to 16 W1 is so as to reduce parasitic coupling from other neighboring sensing pixels. Thus, in some embodiments, because coupling electrodes 411 and 410 have a specific location in alignment to the grid, as shown in FIG. 4C and described above, the conductive pads 237 and 238 are restricted to certain areas. In the example configuration of FIG. 11B, neither of the two conductive pads 237 and 238 are coupled to a conductive region of the underside of the rotary wheel. As shown, both are coupled to non-conductive regions 720. However, one turn to the right would move conductive pad 238, carrying the B channel, to couple to an adjacent conductive region, or, alternatively, one turn to the left would move conductive pad 237, carrying the A channel, to couple to an adjacent conductive region 710.

Figure 12A:
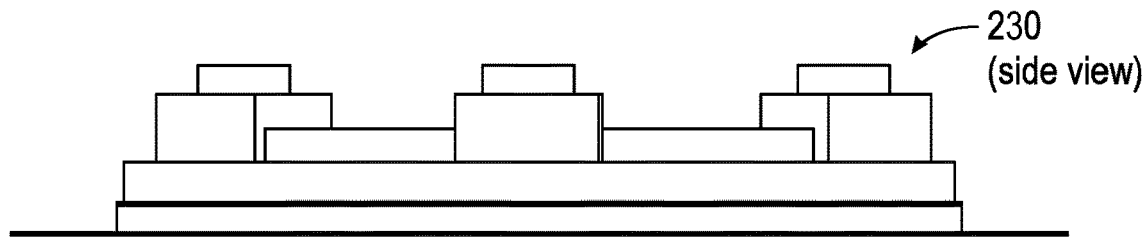
FIG. 12A is a side view of an example rotary wheel, illustrating three example switches provided on its upper surface and equidistantly spaced, according to one or more embodiments.
Figure 12B:
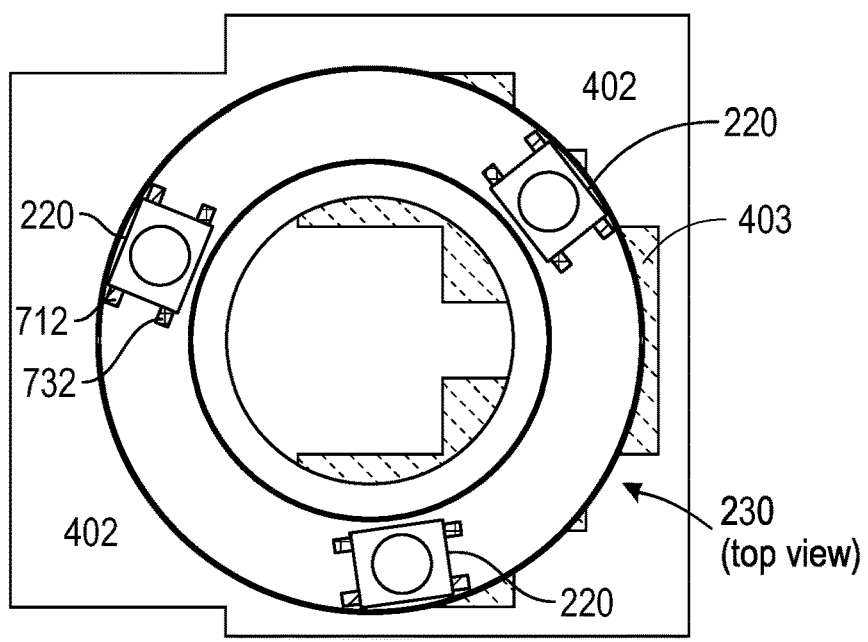
FIG. 12B is a top view of the example rotary wheel of FIG. 12A, illustrating the three example switches as provided above the example sensor grid of an example input device as shown in FIG. 4B, according to one or more embodiments.

Next described is the click, or mechanical response functionality, of pushing the switches closed, and how that is detected in one or more embodiments. In that connection, FIG. 12A is a side view of an example rotary wheel 230, illustrating three example switches 220 provided on its upper surface and equidistantly spaced, according to one or more embodiments. In some embodiments, switches 220 are dome switches. Similarly, FIG. 12B is a top view of the example rotary wheel of FIG. 12A, illustrating the three example switches as provided above the example sensor grid of an example input device as shown in FIG. 4B, according to one or more embodiments, with electrode regions 402 and 403, as described in FIG. 4B. When switches 220 are closed, the two conducting regions 712 and 732, as shown in FIG. 7B, are electrically connected, which is sensed by the input device. As noted above, in one or more embodiments, rotation of the knob interface by a user and pushing down on the knob interface so as to close the switches are orthogonal acts, and do not interfere with one another. This is because whether or not switches 220 are closed does not affect the relative rotation of the fixed base 231 and the rotary wheel 230, or the ability of a user to further rotate them.

Figure 13A:
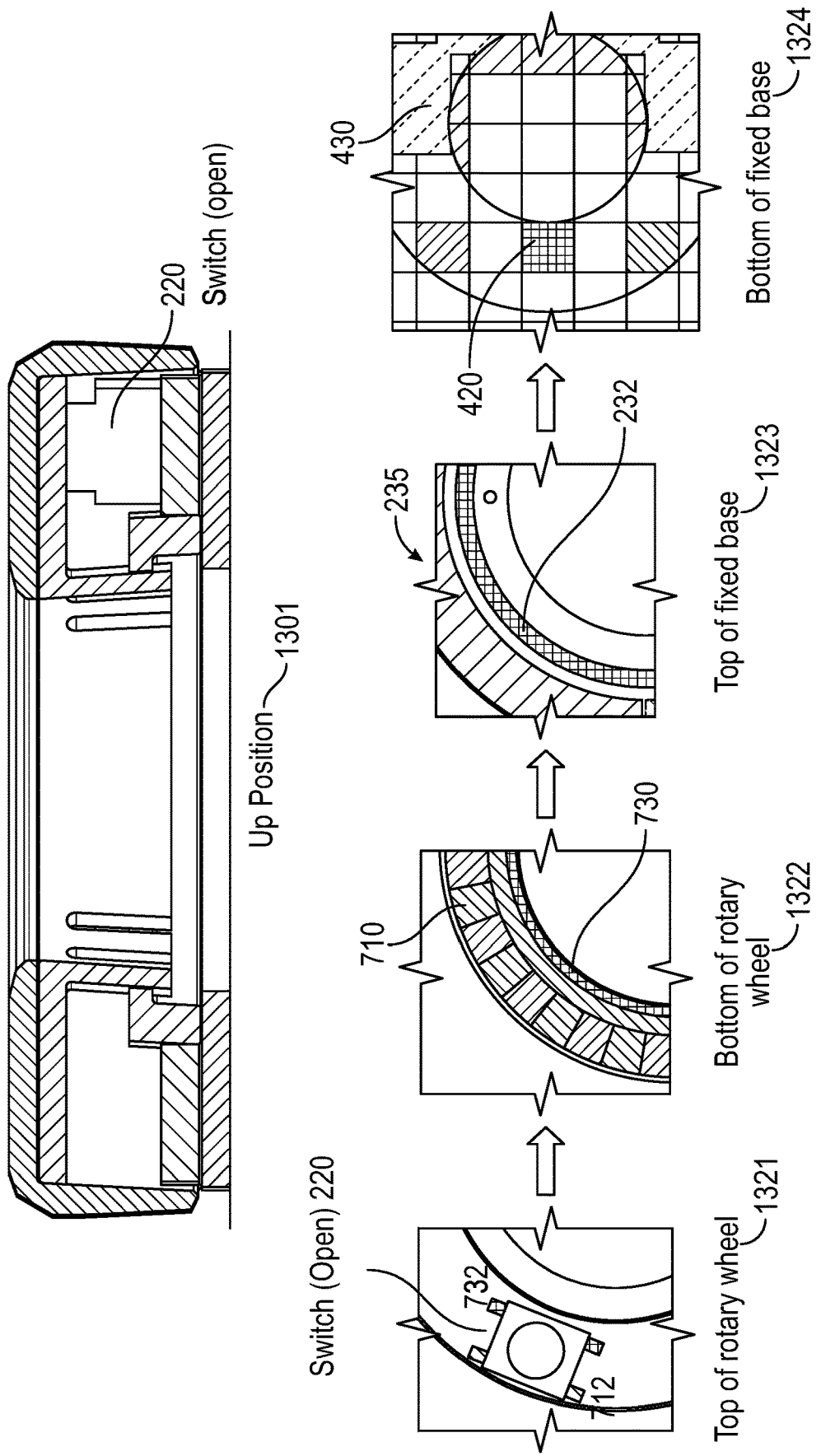
FIG. 13A illustrates a cut-away view illustrating the up position of the example rotatable knob interface of FIGS. 2 and 3, where switches are open, according to one or more embodiments.

As noted above, a user closes the switches by pushing down on the outer cap 215 of FIG. 3. FIG. 13A illustrates a cut-away view illustrating the up position 1301 of the example rotatable knob interface of FIGS. 2 and 3, where switches 220 are open, according to one or more embodiments. FIG. 13A also shows the states of each of the upper and lower surfaces of each of the rotary wheel and the fixed base when the switches are open. As shown in FIG. 13A, drawing 1321 illustrates the top surface of the rotary wheel. Here, when the switch 220 is open, as indicated, there is no connection between the two conducting rings 712 and 732, described above, that are provided near the upper surface of the rotary wheel. As a result, corresponding regions 710 and 730 on the bottom surface of the rotary wheel, as shown at drawing 1322, are also electrically isolated from one another. Thus, as a further result, on the top surface of the fixed base 231, as shown at drawing 1323, inner conducting ring 232 remains isolated from peripheral ring 235, which is coupled to a reference signal via the set of electrodes 430 on the underside of the fixed base, and thus, on the bottom of fixed base, as shown in drawing 1324, electrode 420 (driven by a sensing signal) and the set of electrodes 430 (driven by a reference signal) remain electrically isolated form one another.

Figure 13B:
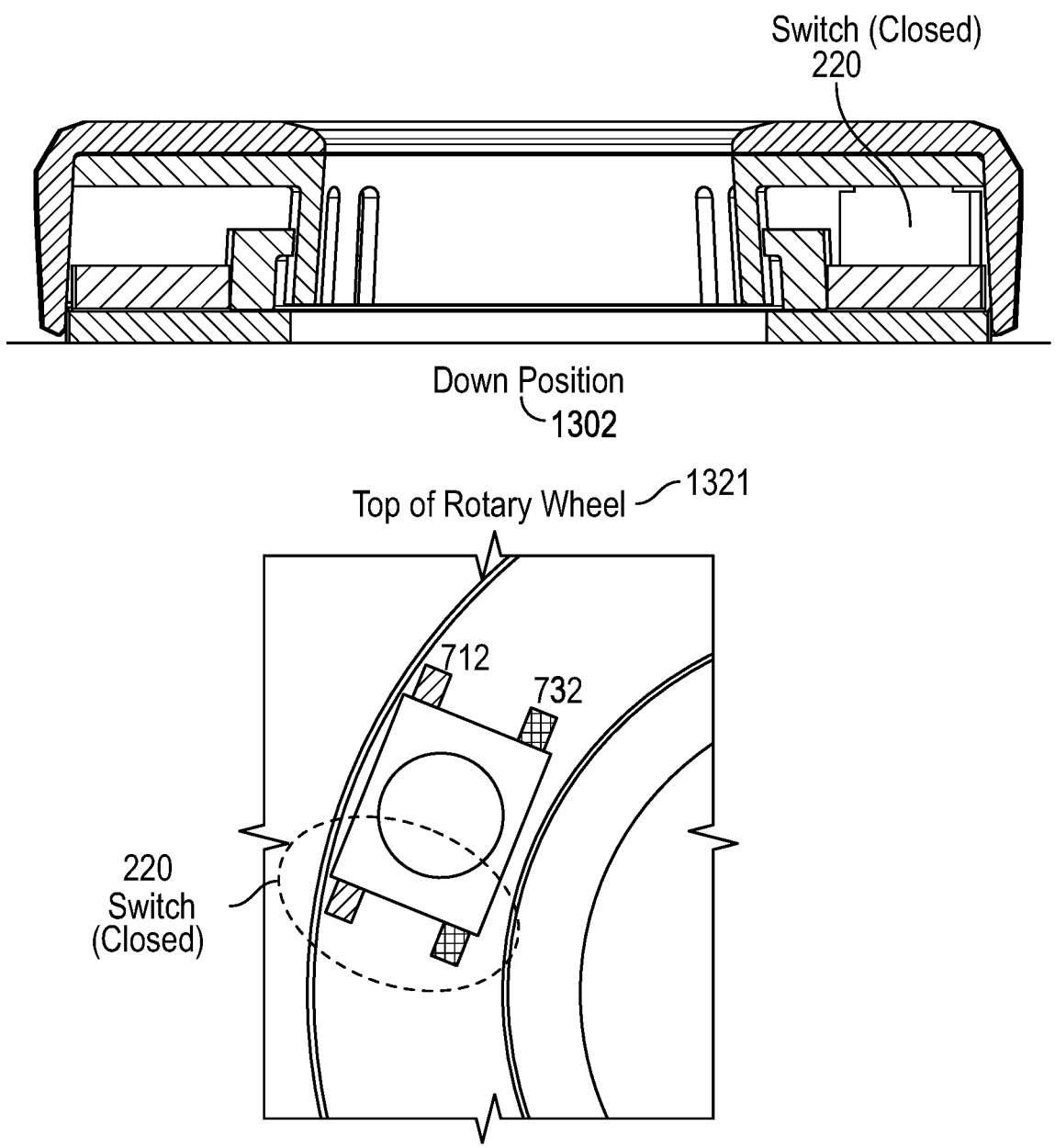
FIG. 13B illustrates a cut-away view illustrating the down position of the example rotatable knob interface of FIGS. 2 and 3, in which position the switch is closed, according to one or more embodiments.

Similarly, FIG. 13B illustrates a cut-away view illustrating the down position 1302 of the example rotatable knob interface of FIGS. 2 and 3, when the switches 220 are closed, as indicated in drawing 1321, according to one or more embodiments. In this case, again with reference to FIG. 13A, there is an electrical connection between the two rings 712 and 732 provided near the top surface of the rotary wheel (as described above with reference to FIG. 7B), and thus the corresponding conductive regions on the bottom of the rotary wheel, namely the conductive regions 710 (all of which are electrically connected to each other) and inner ring 730, as shown at drawing 1322. Further, as shown at drawing 1323, inner conducting ring 232 is now electrically connected to peripheral ring 235 on the top of the fixed base 231, and, as a result, on the bottom of fixed base 231, as shown in drawing 1324, electrode 420 is electrically coupled to the set of electrodes 430 that are coupled to a reference signal of the input device. It is here noted that when the switches are closed, the conductive regions 710, in addition to being coupled to peripheral ring 235, are also partially coupled to the conductive pads 237 and 238 on the top of the fixed base 231. Thus, there may be a slight effect on the signal on inner ring 730 (via electrode 420) when the switches are closed. In particular, when the switches are closed, there will be a slight drop in signal for rotation. Also, electrodes 410 and 411 may also see a slight drop in signal if their corresponding upper conductive pads 237 and 238 are both coupled to conductive regions 710 of the underside of the rotary wheel (as is shown in FIG. 11A, state 4 1140). This is because instead of having just two electrodes 410 and 411 that are coupled to ground, now a third electrode 420 is also coupled to ground due to the switch closing, thus sharing part of the ground (reference) signal provided by the input device's region 403, shown in FIG. 4B. Notwithstanding this small change in signal strength, as noted above, in some embodiments, detection of rotation of the wheel fully operates even while the switches are closed.

Figure 14:
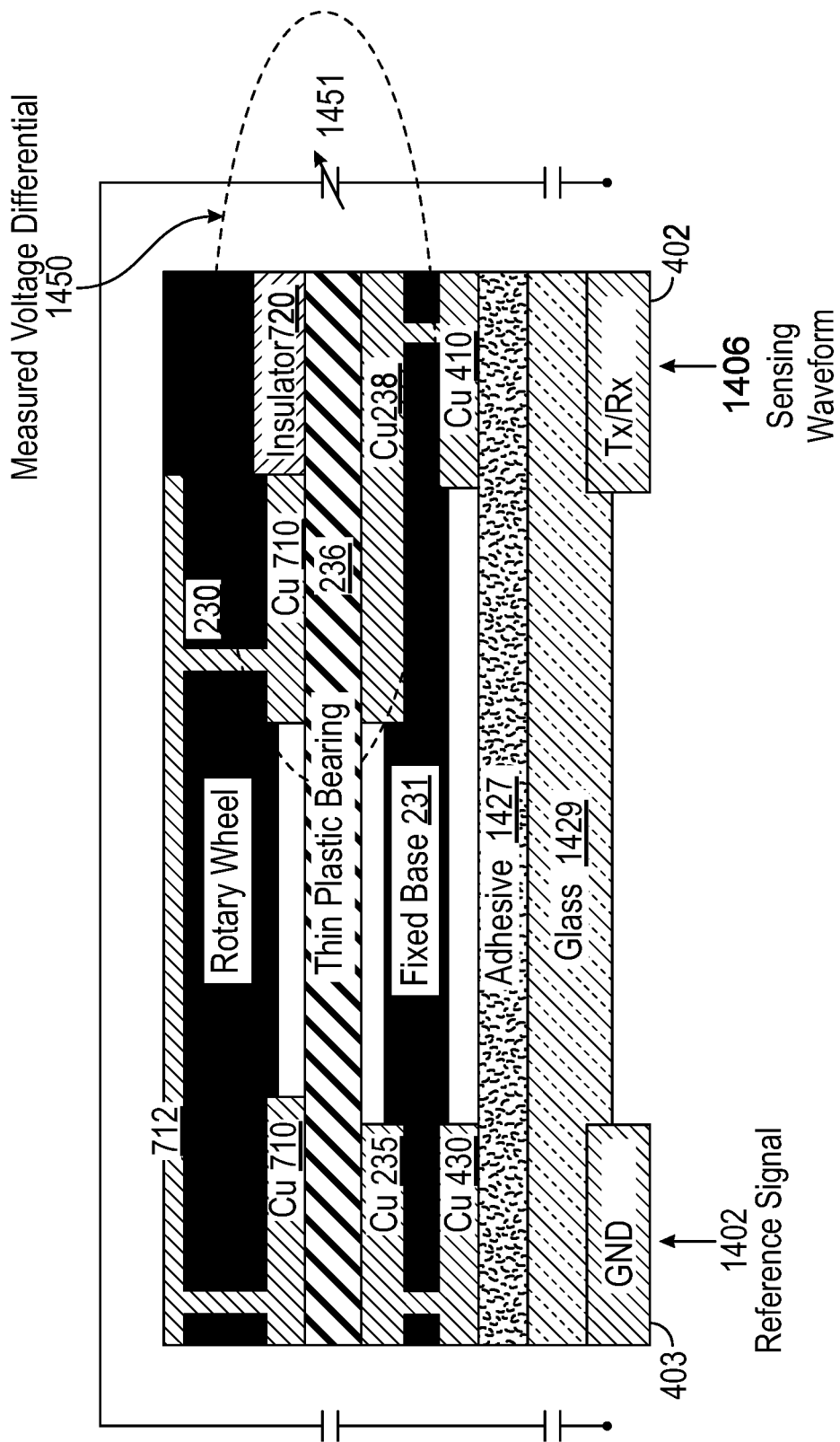
FIG. 14 depicts a schematic cross-section of an example rotatable knob interface, implemented on an input device having a sensing grid, according to one or more embodiments.

FIG. 14 depicts a schematic cross-section of an example rotatable knob interface, implemented on an example input device having a sensing grid, according to one or more embodiments. With reference thereto, beginning at the bottom of FIG. 14, there is shown an upper portion of an example input device, namely glass layer 1429 and two exemplary electrodes 402 and 403 below it. It is noted that, for consistency, the same indexing numbers that were used in FIGS. 4A through 4C for analogous elements, are used here. In the depicted embodiment, glass layer 1429 may be the upper surface of an example input device, such as, for example, a display in an automobile infotainment system. The two representative electrodes 402 and 403 are equivalent to those as shown in FIG. 4B, for example. In the example of FIG. 14, these electrodes are part of a sensing grid. As shown, electrode 403 is driven with a reference signal 1402, for example ground, and electrode 402 is driven with a sensing waveform 1406, as described above.

Continuing with reference to FIG. 14, above glass layer 1429 there is provided an adhesive layer 1427, with which, in embodiments, a fixed base of an example knob interface is secured to the glass surface 1429, and thus to the example input device. From adhesive layer 1427 to the top of the figure are shown components of the example knob interface. Thus, there is a fixed base 231 and a rotary wheel 230, both as described above, with a thin plastic horizontal bearing 236 provided between them. Fixed base 231 has a bottom surface and a top surface, as described above. The bottom surface is provided with coupling electrodes 410 and 430, where 430 couples to reference signal electrode 403 of the example input device, and 410 couples to sensing electrode 402 of the example input device, as described above with reference to FIG. 4C, with the caveat that the cross sectional view of FIG. 14 does not include all of the coupling electrodes of the bottom surface of fixed base 231. The top surface of fixed base 231 includes peripheral ring 235, which is connected, as shown, to set of electrodes 430, which itself is coupled to reference signal carrying electrode 403. The top surface of fixed base 231 also includes conductive pad 238, which is electrically connected to electrode 410.

Continuing further with reference to FIG. 14, above the top surface of fixed base 231 there is horizontal thin plastic bearing 236, as shown, and above the thin plastic bearing 236 is provided rotary wheel 230. Rotary wheel 230, as shown, has a bottom surface on which is provided with both conductive regions 710 and non-conductive regions 720, as described above. In FIG. 14 these are shown as being radially side by side for ease of illustration. However, as shown above in the example of FIG. 8, these two regions are actually provided side by side around the periphery of the wheel, at the same radial distance from the center (e.g., one in front of the other in a dimension coming out of the page in FIG. 14). As also shown by connector 712, all of the conductive regions 710 of the rotary wheel are electrically interconnected, as described above with reference to FIG. 7B. In one or more embodiments, as the rotary wheel 230 rotates, a circuit is coupled when the conductive region 710 of the wheel overlaps conductive pad 238 of the base, and is electrically decoupled when the non-conductive region 720 of the wheel overlaps conductive pad 238 of the base. This creates a voltage differential 1451 between rotary wheel 230 and fixed base 231 which, in one or more embodiments, is measured by the input device. Similarly, although not shown in the cross-section drawing of FIG. 14, a circuit is coupled when the conductive pad 237 of the base is directly underneath, and thus coupled to, a conductive region 710 of the underside of the rotary wheel 230, and is electrically decoupled when the non-conductive region 720 of the wheel overlaps conductive pad 237 of the base.

As shown in FIG. 14, the change in coupling of conductive pad 238 from insulator 720 to conductor Cu 710, via rotation of rotary wheel 230, changes the capacitance 1451, which can, in one or more embodiments, be measured by voltage differential 1450. This measurement is used to detect the relative rotational position of rotary wheel 230 with respect to fixed base 231, as described above.

Figures 15A, 15B:
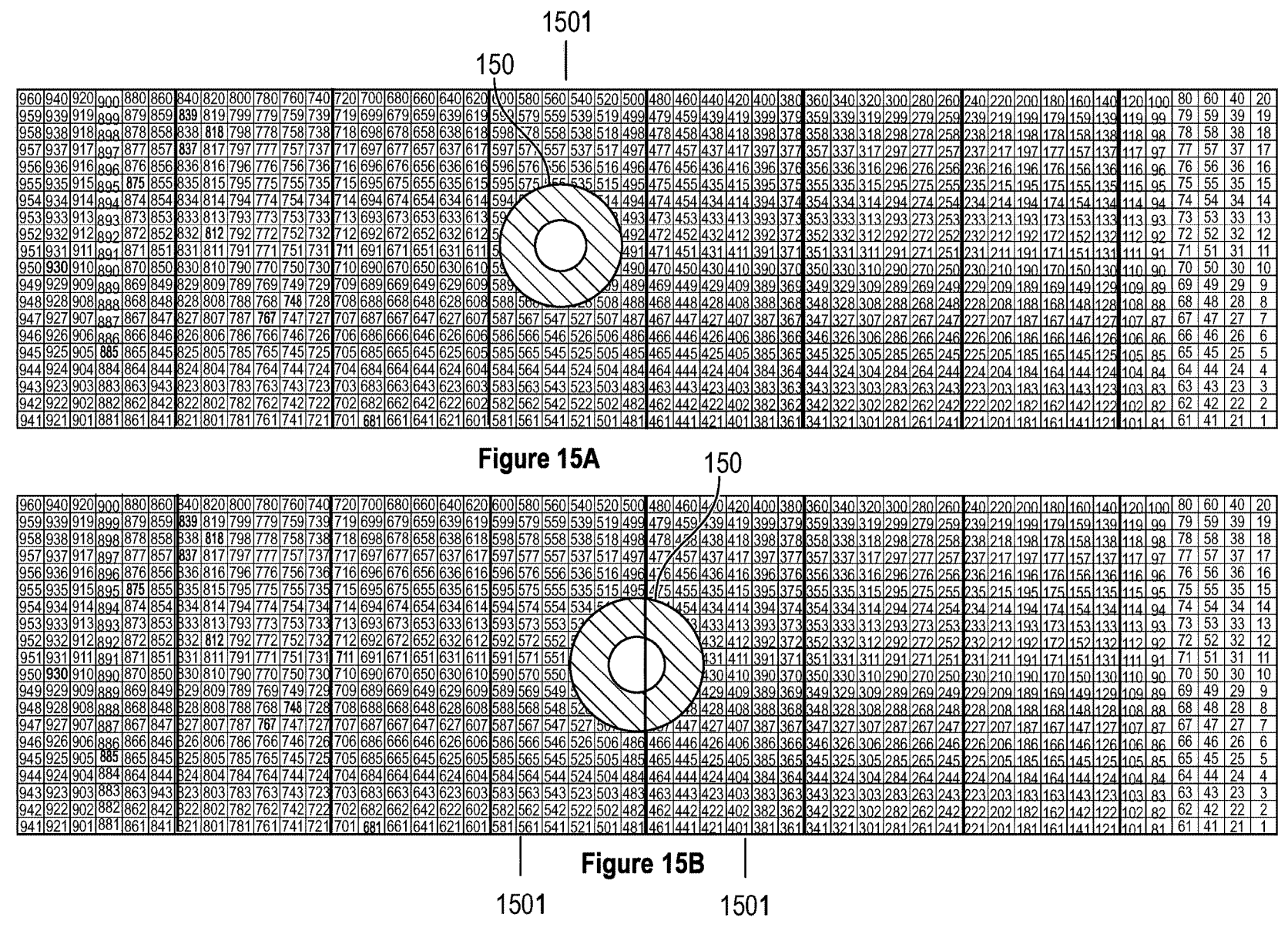
Figure 15C:
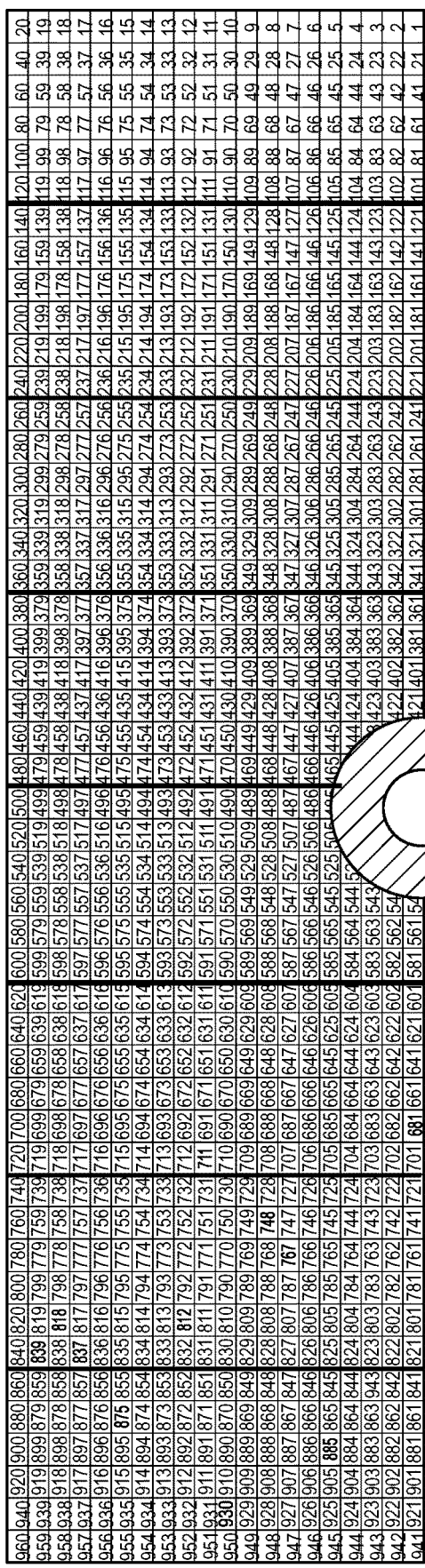
FIG. 15C illustrates a third example placement of a rotatable knob interface above a sensor grid, according to one or more embodiments.

FIGS. 15A, 15B, 15C and 16 illustrate exemplary positioning of the rotatable knob interface 150 on a display panel of an input device. FIG. 15A illustrates a first example placement of a rotatable knob interface 150 as centered above an example sensor grid, according to one or more embodiments. As shown, the example sensor grid includes several sensor arrays, in this example there are eight arrays, each comprising six columns of twenty sensors each. The rotatable knob interface 150 is centered on one of the eight depicted arrays, the fourth array from the left. In this example placement, the coupling electrodes on the bottom surface of the fixed base that receive a reference signal, for example a ground signal, have maximum area. This is because, in a sensor grid of the type shown in FIGS. 15A through 15C, as shown, the touch regions of the display are separated into different slices 1501. In this example, each slice 1501 has six columns of touch pixels, and there a total of 8 slices shown. In this example sensor grid type, only one slice 1501 (also sometimes known as a "mux") out of the eight slices may be sensed at one time. Therefore, in order to sense the knob in one-time instance, it must be located entirely in one mux, as shown, which means it cannot be centered on the sensor gird as a whole, but rather only centered within a single six column slice 1501. In other placements, perhaps more visually symmetric, the number of coupling electrodes receiving a reference signal (e.g., ground) are less. This is next described.

FIG. 15B illustrates a second example placement of a rotatable knob interface above a sensor grid, according to one or more embodiments. Here the rotatable knob interface 150 is centered on the display panel as a whole, which is visually more symmetric, but it straddles two of the eight slices 1501 (sensor arrays), and only one of them may be sensed at a time. As a result, the area of the electrodes on the bottom surface of the fixed base that receive a reference signal is much smaller, on the order of one quarter of the area for the placement case of FIG. 15A. In order to place the knob in the center of the screen, as some users may prefer, only half of the knob will have conductive pads. That half would thus be placed in the desired mux that would sense the knob's rotation. Because of the reduction in conductive area for the reference ground due to the limited space, the knob may have a reduced signal.

Figure 16:
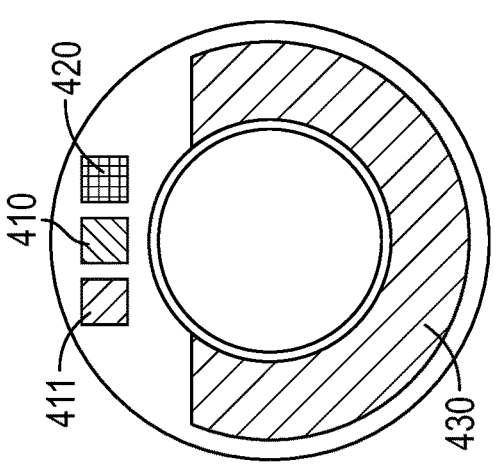
FIG. 16 illustrates a third example placement of a rotatable knob interface, where the interface is provided only partially above the sensor grid, according to one or more embodiments.

FIG. 15C illustrates a third example placement of a rotatable knob interface 150, where the interface is provided only partially above the sensor grid, according to one or more embodiments. In this example embodiment, in order to provide sufficient ground connections, as shown, an external metal grounding 1610 is used. As shown in FIG. 16, a lower portion 1620 of the rotatable knob interface, including the set of electrodes 430, is electrically coupled with the external metal grounding 1610 of FIG. 15C. As further shown in FIG. 16, in this example placement embodiment, the electrodes 410, 411 and 420, which are coupled to electrodes of the input device that are driven with a sensing signal, are provided above the edge of the knob interface, as the sensing signal can only come from electrodes of the sensor grid. This example placement minimizes visual occlusion of the display pane of the input device.

Figure 17:
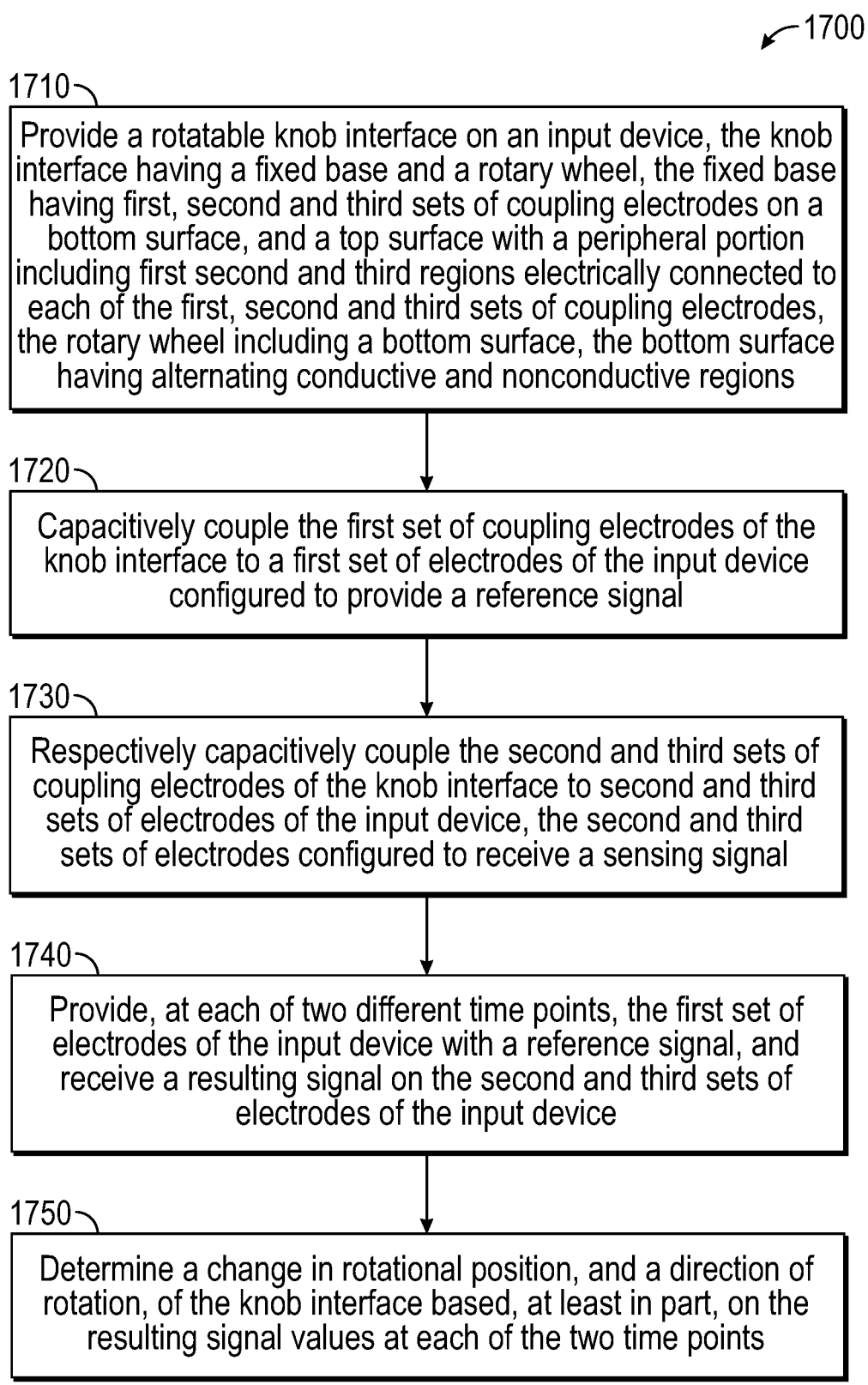
FIG. 17 illustrates an example of a method for implementing a rotatable knob interface on an example input device, according to one or more embodiments.

FIG. 17 is a process flow chart illustrating a method 1700 for implementing a rotatable knob interface on an example electronic device, and determining a position and/or state of the rotatable knob interface according to one or more embodiments. For example, the electronic device may be a combined display and sensing device, such as one that, for example, includes TDDI technology, as described above.

Method 1700 includes blocks 1710 through 1750. In alternate embodiments, method 1700 may have more, or fewer, blocks. Method 1700 begins at block 1710, where a rotatable knob interface is provided on an input device, the rotatable knob interface having a fixed base and a rotary wheel, the fixed base having first, second and third sets of coupling electrodes on a bottom surface, and a top surface with a peripheral portion including first second and third regions electrically connected to each of the first, second and third sets of coupling electrodes. The rotary wheel has a bottom surface provided with alternating conductive and non-conductive regions. For example, the rotatable knob interface may be any of those illustrated in FIGS. 1 through 14, and described above.

From block 1710, method 1700 proceeds to block 1720, where the first set of coupling electrodes of the knob interface is capacitively coupled to a first set of electrodes of the input device configured to provide a reference signal. For example, the first set of electrodes may be electrodes 430 of FIG. 4A. Or, for example, the set of first electrodes may include a single electrode. As regards the reference signal, for example, it may be a ground signal generated by processing circuitry of the electronic device, such as, for example, the processing circuitry 110 of the electronic device 100 of FIG. 1. As another example, the reference signal may be a ground signal output by a TDDI device from an arbitrarily chosen analog front end.

From block 1720, method 1700 proceeds to block 1730, where the second and third sets of coupling electrodes of the knob interface are capacitively coupled to second and third sets of electrodes of the input device, the second and third sets of electrodes configured to receive a sensing signal. For example, the second and third sets of coupling electrodes may be the electrodes 410 and 411 of FIG. 4A, and they may all be coupled to ones of input device electrodes 402 of FIG. 4B. In some embodiments, the same sensing signal is provided to all of device electrodes 402 of FIG. 4B, and thus the second and third sets of coupling electrodes are coupled to the same signal.

From block 1730, method 1700 proceeds to block 1740, where, at each of two different time points, the first set of electrodes of the input device is provided with a reference signal, and a resulting signal is then received on the second and third sets of electrodes of the input device. As noted above, the resulting signal is the same signal used to drive each of the second and third sets of electrodes, except that when it is measured, it has been modified by the relative rotational positions of the fixed base and rotary wheel of the rotatable knob interface, as described above, for example, with reference to FIGS. 10, 11A and 11B. As noted, the second and third set of electrodes of the input device may be driven with the same sensing signal.

From block 1740, method 1700 proceeds to block 1750, where, based at least in part on the data obtained at each of the two different time points, a change in rotational position and a direction of rotation of the knob interface is determined. In one or more embodiments, this determination may be performed by firmware stored in a memory of the input device. Method 1700 terminates at block 1750.

Figure 18:
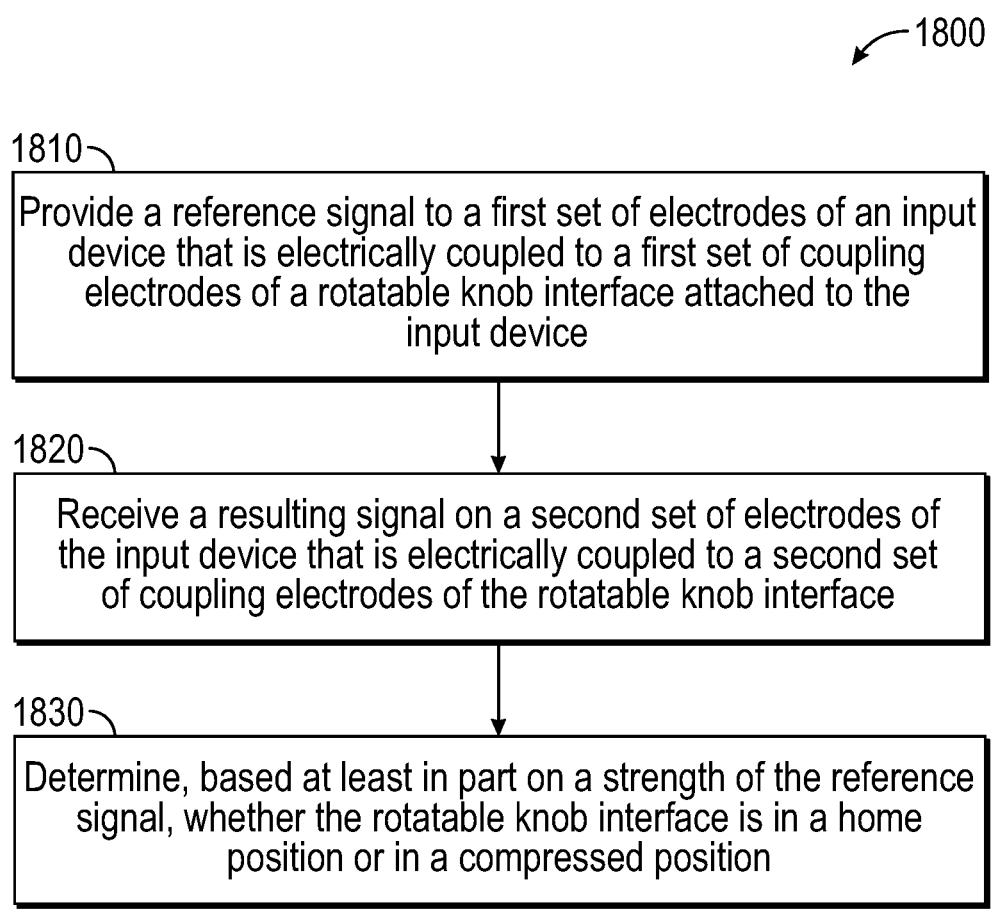
FIG. 18 illustrates an example of a method for processing signals from an input device having a rotational interface, according to one or more embodiments.

FIG. 18 is a process flow chart illustrating a method 1800 for processing signals from an example combined display and sensing device ("input device") having a rotatable knob interface attached to it, where the knob interface is additionally provided with "click" sensing apparatus, such as, for example, the switches illustrated in FIGS. 2, 3, 12 and 13, and described above, in accordance with various embodiments. Thus, the example rotatable knob interface has a home, or "uncompressed" state, as well as a "compressed" state. For example, the electronic device may include TDDI technology, as described above, and the rotatable knob interface may be any of the rotatable knobs illustrated in FIGS. 1-14, described above.

Method 1800 includes blocks 1810 through 1830. In alternate embodiments, method 1800 may have more, or fewer, blocks. Method 1800 begins at block 1810, where a reference signal is provided to a first set of electrodes of an input device that is electrically coupled to a first set of coupling electrodes of a rotatable knob interface that is attached to the input device. For example, the first set of electrodes may be electrodes may be electrodes 430 of FIG. 4A, and, for example, the reference signal may be a ground signal of the input device, or, for example, another signal generated by processing circuitry of the input device.

From block 1810, method 1800 proceeds to block 1820, where a resulting signal is received on a second set of electrodes of the input device that is electrically coupled to a second set of coupling electrodes of the rotatable knob interface, the resulting signal modified by the rotatable knob interface. For example, the second set of electrodes may be the electrode 420 of FIG. 4A, and it may be coupled to one of input device electrodes 402 of FIG. 4B.

From block 1820, method 1800 proceeds to block 1830, where it may be determined, based at least in part on a strength of the reference signal provided to the first electrode of the input device, whether the rotatable knob interface is in a home position, where the switches are open, such as is shown in FIG. 13A, or whether it is in a closed position, where the switches are closed, as shown in FIG. 13B. As noted above, when in the home, or open position, there is no connection, because the switches 220 is open, and inner ring 730 of the bottom surface of the rotary wheel is floating. On the other hand, when the rotatable knob interface is in a compressed position, such as is shown in FIG. 13B, then there is an electrical connection, due to the switches 220 now being closed, and inner ring 730 of the bottom surface of the rotary wheel is electrically connected to all of conductive regions 710 of the rotary wheel. Method 1800 then terminates at block 1830.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A rotatable electronic device, comprising:
  a stationary base configured to attach to an input device, comprising:
    a bottom surface including:
      a first set of coupling electrodes configured to be aligned with, and receive a reference signal from, a first set of electrodes of the input device,
      a second set of coupling electrodes configured to be aligned with, and receive resulting signals from, a second set of electrodes of the input device, and
      a third set of coupling electrodes configured to be aligned with, and receive resulting signals from, the second set of electrodes of the input device; and
    a top surface including a top peripheral portion including first, second and third regions respectively connected to the first, second and third sets of coupling electrodes; and
  a rotary wheel configured to rotate relative to the stationary base, the rotary wheel including a bottom surface including a bottom peripheral portion provided with alternating conductive and non-conductive regions and configured to align with the top peripheral portion of the stationary base,
  wherein the resulting signals received at each of the second set of the coupling electrodes and the third set of coupling electrodes are modified by the relative positions of the stationary base and the rotary wheel.

2. The rotatable electronic device of claim 1, wherein the resulting signals received at each of the second and third sets of coupling electrodes of the stationary base are a function of the respective overlap of the second and third regions of the top peripheral portion of the stationary base with the alternating conductive and non-conductive regions of the rotary wheel.

3. The rotatable electronic device of claim 1, wherein the stationary base and the rotary wheel are each ring shaped, with substantially equal outer diameters, and wherein the stationary base has a smaller inner diameter than that of the rotary wheel.

4. The rotatable electronic device of claim 3, further comprising a first plastic bearing provided between the top surface of the stationary base and a bottom surface of the rotary wheel, and a second substantially tubular plastic bearing provided on an inner ring shaped region of the top surface of the stationary base and abutting an inner substantially vertical surface of the rotary wheel.

5. The rotatable electronic device of claim 1, wherein the alternating conductive and non-conductive regions of the bottom surface of the rotary wheel have substantially equal size.

6. The rotatable electronic device of claim 1, wherein the second and third regions of the top surface of the stationary base have equal sizes.

7. The rotatable electronic device of claim 6, wherein the size of the second and third regions of the top surface of the stationary base is configured to equal one half the size of that of each of the alternating conductive and non-conductive regions of the rotary wheel.

8. The rotatable electronic device of claim 1, wherein the respective sizes of the second and third regions of the top surface of the stationary base, and the alternating conductive and non-conductive regions of the rotary wheel, are configured such that at different rotational positions of the rotary wheel each of the following states respectively occurs:
both the second and third regions couple to a conductive region of the of the rotary wheel;
the second region couples to a conductive region of the of the rotary wheel; but the third region does not;
neither the second nor the third regions couple to a conductive region of the rotary wheel; and
the second region does not couple to a conductive region of the rotary wheel, but the third region does.

9. The rotatable electronic device of claim 1, wherein the reference signal is a ground signal.

10. The rotatable electronic device of claim 1, wherein:
the bottom surface of the stationary base further comprises a fourth set of coupling electrodes respectively configured to be aligned with, and receive resulting signals from, a corresponding fourth set of electrodes of the input device,
the top surface of the stationary base further comprises an inner ring, provided interior to the top peripheral portion, the inner ring connected to the fourth set of coupling electrodes;
the bottom surface of the rotary wheel further comprises an inner conducting ring, the inner conducting ring configured to align with the top peripheral portion of the stationary base; and
the rotary wheel further comprising a top surface, the top surface including an outer conductive region electrically connected to each of the conductive regions on the bottom surface of the rotary wheel, and an inner conductive region, electrically connected to the inner conducting ring of the rotary wheel bottom surface.

11. The rotatable electronic device of claim 10, further comprising:

one or more switches provided on an upper surface of the rotary wheel, the switches, when closed, electrically connecting the outer conductive region and the inner conductive region.

12. A sensing system, comprising:
an input device comprising a display panel, processing circuitry, and a plurality of electrodes and a rotatable electronic device configured to be attached to the display panel, the rotatable electronic device comprising:
a stationary base, comprising:
a bottom surface including a first set of coupling electrodes configured to be aligned with, and receive a reference signal from, a first set of electrodes of the input device, and second and third sets of coupling electrodes respectively configured to be aligned with, and receive resulting signals from, corresponding second and third sets of electrodes of the input device; and
a top surface including a top peripheral portion including first, second and third regions respectively connected to the first, second and third sets of coupling electrodes; and
a rotary wheel provided above and configured to rotate relative to the stationary base, the rotary wheel including a bottom surface including a bottom peripheral portion provided with alternating conductive and non-conductive regions and configured to align with the top peripheral portion of the stationary base,
wherein the resulting signals received at each of the second and third sets of coupling electrodes are modified by the relative positions of the stationary base and the rotary wheel.

13. The sensing system of claim 12, wherein the input device includes one of a liquid crystal display (LCD) or an optical light emitting diode (OLED) display, and the stationary base is attached on an upper surface of the input device.

14. The sensing system of claim 12, wherein the input device further comprises firmware stored in a memory, the firmware configured to detect the resulting signals and determine a rotational position of the rotary wheel relative to the stationary base.

15. The sensing system of claim 12, wherein:
the bottom surface of the stationary base further comprises a fourth set of coupling electrodes respectively configured to be aligned with, and receive resulting signals from, a corresponding fourth set of electrodes of the input device,
the top surface of the stationary base further comprises an inner ring, provided interior to the top peripheral portion, the inner ring connected to the fourth set of coupling electrodes;
the bottom surface of the rotary wheel further comprises an inner conducting ring, the inner conducting ring configured to align with the top peripheral portion of the stationary base; and
the rotary wheel further comprising a top surface, the top surface including an outer conductive region electrically connected to each of the conductive regions on the bottom surface of the rotary wheel, and an inner conductive region, electrically connected to the inner conducting ring of the rotary wheel bottom surface, and further comprising:
one or more switches provided on an upper surface of the rotary wheel, the switches, when closed, electrically connect the outer conductive region and the inner conductive region, which further electrically couples the fourth set of coupling electrodes with the first set of coupling electrodes.

16. The sensing system of claim 12, wherein the plurality of electrodes of the display panel includes one or more arrays of electrodes, and wherein the rotatable electronic device is one of:
    attached to the display panel in a central portion of an array of electrodes;
    attached to the display panel so as to straddle a boundary between two arrays of electrodes; or
    partially attached to an edge of the display panel, with a portion of the rotatable electronic device extending off of the display panel.

17. The sensing system of claim 12, wherein the sensing system is disposed in an automobile.

18. A method of processing signals from an input device having a rotatable interface, the rotatable interface including a first set of coupling electrodes aligned with and coupled to a first set of electrodes of the input device, and second and third sets of coupling electrodes respectively coupled with corresponding second and third sets of electrodes of the input device, the rotatable interface attached to a display screen of the input device, the method comprising:
    providing a reference signal to the first set of electrodes of the input device;
    receiving a resulting signal on each of the second and third sets of electrodes of the input device, the respective resulting signals modified by the rotatable interface; and
    determining a rotational position of the rotatable interface based, at least in part, on the two resulting signals.

19. The method of claim 18, wherein rotatable interface further comprises a stationary base, in which the first, second and third sets of coupling electrodes are provided, and a rotary wheel, coupled to the first, second and third sets of coupling electrodes, the rotary wheel including a bottom surface on which alternating conductive and non-conductive regions are patterned, and wherein the resulting signals are generated based, at least in part, on the respective coupling of each of the second and third sets of coupling electrodes with the alternating conductive and non-conductive regions of the rotary wheel.

20. The method of claim 18, wherein the rotational interface further comprises a fourth set of coupling electrodes, aligned with and coupled to a corresponding fourth set of electrodes of the input device, and wherein the rotational interface is further configured to have two states:
    a first state, in which the fourth set of coupling electrodes is electrically coupled to the first set of coupling electrodes as a result of user action; and
    a second state, in which the fourth set of coupling electrodes is floating and
    further comprising determining whether the rotational interface is in the first state or in the second state, based, at least in part, on a signal of the fourth set of electrodes of the input device.

* * * * *